United States Patent
Xiao et al.

(10) Patent No.: US 11,838,389 B2
(45) Date of Patent: Dec. 5, 2023

(54) SERVICE DEPLOYMENT METHOD AND SCHEDULING APPARATUS

(71) Applicant: Huawei Cloud Computing Technologies Co., Ltd., Guizhou (CN)

(72) Inventors: Lei Xiao, Shenzhen (CN); Bo Jin, Beijing (CN); Si Shen, Beijing (CN); Youqiang Li, Shenzhen (CN)

(73) Assignee: HUAWEI CLOUD COMPUTING TECHNOLOIGES CO., LTD., Guizhou (CN)

( * ) Notice: Subject to any disclaimer, the term of this patent is extended or adjusted under 35 U.S.C. 154(b) by 9 days.

(21) Appl. No.: 17/563,555

(22) Filed: Dec. 28, 2021

(65) Prior Publication Data

US 2022/0124172 A1    Apr. 21, 2022

Related U.S. Application Data

(63) Continuation of application No. PCT/CN2020/094442, filed on Jun. 4, 2020.

(30) Foreign Application Priority Data

Jun. 29, 2019   (CN) .......................... 201910581292.5

(51) Int. Cl.
  *H04L 67/61*   (2022.01)
  *H04L 67/00*   (2022.01)
  *H04L 67/51*   (2022.01)
  *H04L 47/80*   (2022.01)

(52) U.S. Cl.
  CPC ............ *H04L 67/61* (2022.05); *H04L 47/805* (2013.01); *H04L 67/34* (2013.01); *H04L 67/51* (2022.05)

(58) Field of Classification Search
  CPC ....... H04L 67/61; H04L 47/805; H04L 67/34; H04L 67/51
  See application file for complete search history.

(56) References Cited

U.S. PATENT DOCUMENTS

| | | | |
|---|---|---|---|
| 2008/0181117 A1* | 7/2008 | Acke | H04L 47/829 370/236.2 |
| 2008/0181118 A1 | 7/2008 | Sharma et al. | |
| 2017/0300353 A1* | 10/2017 | Yu | H04L 45/302 |

(Continued)

FOREIGN PATENT DOCUMENTS

| | | |
|---|---|---|
| CN | 102204209 A | 9/2011 |
| CN | 102404137 A | 4/2012 |
| CN | 104104602 A | 10/2014 |

(Continued)

*Primary Examiner* — Phuoc H Nguyen
*Assistant Examiner* — Steven C Nguyen
(74) *Attorney, Agent, or Firm* — Conley Rose, P.C.

(57) ABSTRACT

A service deployment method determining an execution path of a to-be-deployed service, the execution path includes a first execution device and a second execution device; obtaining a first quality of service (QoS) of the first execution device; obtaining a second QoS of the second execution device; calculating a third QoS of the execution path based on the first QoS and the second QoS; obtaining a preset QoS of the to-be-deployed service; making a first determination that a first relationship between the third QoS and the preset QoS meets a preset rule; and deploying, in response to the first determination, the to-be-deployed service on the execution path.

20 Claims, 9 Drawing Sheets

(56) References Cited

U.S. PATENT DOCUMENTS

2019/0319844 A1* 10/2019 Ding ..................... H04L 41/50
2020/0382387 A1* 12/2020 Pasupathy ............. H04L 45/123

FOREIGN PATENT DOCUMENTS

| CN | 104518993 | A | 4/2015 |
|---|---|---|---|
| CN | 104539535 | A | 4/2015 |
| CN | 108243044 | A | 7/2018 |
| CN | 108494601 | A | 9/2018 |
| CN | 109729557 | A | 5/2019 |
| CN | 110430236 | A | 11/2019 |
| KR | 20090119478 | A | 11/2009 |
| WO | 2015168888 | A1 | 11/2015 |

* cited by examiner

SERVICE DEPLOYMENT METHOD AND SCHEDULING APPARATUS

CROSS-REFERENCE TO RELATED APPLICATIONS

This application is a continuation application of International Patent Application No. PCT/CN2020/094442 filed on Jun. 4, 2020, which claims priority to Chinese Patent Application No. 201910581292.5 filed on Jun. 29, 2019. The disclosures of the aforementioned patent applications are hereby incorporated by reference in their entireties.

TECHNICAL FIELD

This disclosure relates to the field of cloud computing, and in particular, to a service deployment method and a scheduling apparatus.

BACKGROUND

A scheduling apparatus is usually deployed on a cloud platform, and is configured to select, based on a requirement of a to-be-deployed service, an execution path for deploying the to-be-deployed service. Further, the scheduling apparatus selects, based on a type of the to-be-deployed service, at least one execution device that meets the requirement of the to-be-deployed service and that is configured to execute the to-be-deployed service, to determine an execution path including the at least one selected execution device, and deploy the to-be-deployed service on the determined execution path.

Usually, the scheduling apparatus selects, based on quality of service (QoS) of each execution device, an execution device that meets the requirement of the to-be-deployed service. When determining the execution path, the scheduling apparatus focuses only on QoS of one or several execution devices. This is because different to-be-deployed services have different QoS requirements for execution devices. For example, a to-be-deployed communications service has a relatively high QoS requirement for an execution device used for forwarding, and a relatively low QoS requirement for an execution device used for computing. Conversely, a to-be-deployed financial service has a relatively low QoS requirement for an execution device used for forwarding, and a relatively high QoS requirement for an execution device used for computing. However, the execution path is selected based on the QoS of the one or several execution devices. Consequently, the execution path selected by the scheduling apparatus can only roughly meet the requirement of the to-be-deployed service, but may not fully meet the requirement of the to-be-deployed service.

SUMMARY

This application provides a service deployment method and a scheduling apparatus, to calculate QoS of execution paths, and select, based on the QoS of the execution paths, an execution path for deploying a to-be-deployed service. This makes execution path selection more accurate and avoids a case in which the selected execution path cannot meet a requirement of the to-be-deployed service.

According to a first aspect of embodiments of this application, a service deployment method is provided, and includes that a scheduling apparatus may determine, based on an identifier of a to-be-deployed service, a path (which may also be referred to as an execution path) on which the to-be-deployed service can be executed, where the execution path includes at least two execution devices, then, the scheduling apparatus further obtains QoS of each execution device on the execution path, and calculates QoS of the execution path based on the QoS of each execution device on the execution path, and finally, the scheduling apparatus determines whether a relationship between the QoS of the execution path and preset QoS (the preset QoS of the to-be-deployed service is preset in the scheduling apparatus by a user, and after the user sets the preset QoS, the scheduling apparatus obtains the preset QoS of the to-be-deployed service) of the to-be-deployed service meets a preset rule, if the scheduling apparatus determines that the relationship meets the preset rule, the scheduling apparatus deploys the to-be-deployed service on the execution path, and all the execution devices on the execution path are used to execute the to-be-deployed service.

The embodiments of this application first provides a solution in which the scheduling apparatus determines, based on QoS of execution devices on an execution path, a capability of the execution path to provide a service, obtains the QoS of execution path, and selects, based on the QoS of the execution path, an execution path for deploying the to-be-deployed service, to determine the capability of the execution path to provide a service. In addition, the capability (that is, the QoS of the execution path) of the execution path to provide a service is accurately measured. This makes execution path selection more accurate and avoids a case in which the selected execution path cannot meet a requirement of the to-be-deployed service.

In a possible implementation, before the scheduling apparatus calculates the QoS of the execution path based on the QoS of each execution path, the scheduling apparatus may further obtain QoS of a transmission link between every two execution devices on the execution path. In this case, the scheduling apparatus calculates the QoS of the execution path based on the QoS of each execution device on the execution path and the QoS of the transmission link between every two execution devices.

In the embodiments of this application, to obtain more accurate QoS of the execution path, not only the QoS of each execution device on the execution path is considered, but also the QoS of the transmission link between the execution devices on the execution path is considered. In other words, in addition to the QoS of the execution devices on the execution path, the scheduling apparatus further obtains the QoS of the transmission link between the execution devices, and determines the QoS of the execution path based on the QoS of the execution devices and the QoS of the transmission link, so that the calculated QoS of the entire execution path is more accurate.

In a possible implementation, the scheduling apparatus may obtain the QoS of each execution device on the execution path in the following manner. First, the scheduling apparatus determines a QoS calculation formula corresponding to each execution device on the execution path, where one execution device corresponds to one QoS calculation formula, then, the scheduling apparatus sends each QoS calculation formula to a corresponding execution device, and the corresponding execution device calculates QoS of the execution device according to the QoS calculation formula, and finally, the scheduling apparatus obtains the QoS of each execution device from the execution device on the execution path.

The embodiments of this application further describe how the scheduling apparatus obtains the QoS of the execution device (that is, the scheduling apparatus obtains the QoS of the execution device by sending the corresponding QoS calculation formula to each execution device). This is practical.

In a possible implementation, the scheduling apparatus may obtain the QoS of the transmission link between every two execution devices on the execution path in the following manner. First, the scheduling apparatus determines the transmission link between every two execution devices on the execution path, and determines a QoS calculation formula corresponding to each transmission link, where one transmission link corresponds to one QoS calculation formula, then, the scheduling apparatus sends the QoS calculation formula corresponding to each transmission link to at least one of the two execution devices that are connected to form the transmission link, and the at least one execution device calculates the QoS of the transmission link according to the corresponding QoS calculation formula, and finally, the scheduling apparatus obtains the QoS of the corresponding transmission link from the at least one execution device.

In the embodiments of this application, similar to a manner in which the scheduling apparatus obtains the QoS of the execution device, how the scheduling apparatus obtains the QoS of the transmission link between the two execution devices (that is, the scheduling apparatus obtains the QoS of the transmission link by sending, to each execution device, the QoS calculation formula corresponding to the transmission link) is further described herein. This has wide applicability.

In a possible implementation, that the scheduling apparatus calculates the QoS of the execution path based on the QoS of each execution device on the execution path may include first, determining a weight of the QoS of each execution device on the execution path, where the weight of the QoS of the execution device indicates an importance degree of the execution device on the execution path, and finally, determining the QoS of the execution path based on the QoS of each execution device and the corresponding weight of the QoS.

In the embodiments of this application, the scheduling apparatus further determines the importance degree of each execution device on the execution path based on the weight of the QoS of the execution device. This is more targeted.

In a possible implementation, that the scheduling apparatus determines the execution path may include that the scheduling apparatus determines N (N≥1) execution paths based on resources required by the to-be-deployed service, so that specifications of resources included in execution devices on each of the N execution paths are not lower than specifications of the resources required by the to-be-deployed service, then, the scheduling apparatus calculates QoS of the N execution paths, if the scheduling apparatus determines that a relationship between any QoS in the QoS of the N execution paths and the preset QoS does not meet the preset rule, the scheduling apparatus adjusts specifications of resources of execution devices on any execution path until an execution path (which may be referred to as the adjusted execution path) that meets a preset QoS condition is obtained, and finally, the scheduling apparatus deploys the to-be-deployed service on the adjusted execution path.

The embodiments of this application further illustrate that when a relationship between the QoS of each of the N execution paths and the preset QoS does not meet the preset rule, the scheduling apparatus performs resource adjustment, to deploy the to-be-deployed service on the adjusted execution path. This ensures reliability and stability of the to-be-deployed service.

In a possible implementation, after the scheduling apparatus determines that the relationship between the QoS (that is, QoS of the execution path in a current periodicity) of the execution path and the preset QoS meets the preset rule, the scheduling apparatus may further predict QoS of the execution path in a next periodicity, to obtain predicted QoS of the execution path. If the scheduling apparatus further determines that a relationship between the predicted QoS of the execution path and the preset QoS also meets the preset rule, the scheduling apparatus determines to deploy the to-be-deployed service on the execution path.

In the embodiments of this application, the scheduling apparatus not only compares QoS of each execution path in the current periodicity with the preset QoS, but also compares QoS of each execution path in the next periodicity with the preset QoS. The scheduling apparatus deploys the to-be-deployed service on the execution path only when a relationship between the QoS of the execution path in the current periodicity and the preset QoS and a relationship between the QoS of the execution path in the next periodicity and the preset QoS meet a preset relationship. This further ensures stability of the to-be-deployed service.

According to a second aspect of embodiments of this application, a scheduling apparatus is provided. The scheduling apparatus implements the method in the foregoing embodiments by hardware or by hardware by executing corresponding software, and the hardware or the software includes one or more modules corresponding to the method in the foregoing embodiments. For example, the scheduling apparatus may include a path selection module and a service deployment module.

The path selection module is configured to determine an execution path of a to-be-deployed service, where the execution path includes at least two execution devices, obtain QoS of each execution device, calculate QoS of the execution path based on the QoS of each execution device, obtain preset QoS of the to-be-deployed service, and determine that a relationship between the QoS of the execution path and the preset QoS meets a preset rule.

The service deployment module is configured to, after the path selection module determines that the relationship between the QoS of the execution path and the preset QoS meets the preset rule, deploy the to-be-deployed service on the execution path, where the at least two execution devices are configured to separately execute the to-be-deployed service.

In a possible implementation, the path selection module is further configured to, before calculating the QoS of the execution path based on the QoS of each execution device, obtain QoS of at least one transmission link between the at least two execution devices, and calculate the QoS of the execution path based on the QoS of each execution device and the QoS of the at least one transmission link.

In a possible implementation, the path selection module is further configured to determine at least two first QoS calculation formulas corresponding to each execution device, where one execution device corresponds to one QoS calculation formula, send each first QoS calculation formula to a corresponding execution device, and finally, obtain the QoS of each execution device that is obtained by each execution device according to a corresponding first QoS calculation formula.

In a possible implementation, the path selection module is further configured to determine at least one second QoS calculation formula corresponding to the at least one transmission link, send each second QoS calculation formula to an execution device on a corresponding transmission link, and finally, obtain QoS of each transmission link that is obtained by the execution device on the at least one transmission link according to a corresponding second QoS calculation formula.

In a possible implementation, the path selection module is further configured to determine a weight of the QoS of each execution device, and determine the QoS of the execution path based on the QoS of each execution device and the corresponding weight.

In a possible implementation, the path selection module is further configured to determine N execution paths based on resources required by the to-be-deployed service, where specifications of resources included in execution devices on each execution path are not lower than specifications of the resources required by the to-be-deployed service, and determine that a relationship between QoS of each of the N execution paths and the preset QoS does not meet the preset rule, and adjust specifications of resources of execution devices on any execution path until an execution path that meets a preset QoS condition is obtained.

In a possible implementation, after the path selection module determines that the relationship between the QoS of the execution path and the preset QoS meets the preset rule, the path selection module is further configured to predict QoS of the execution path in a next periodicity, to obtain predicted QoS of the execution path, where the QoS of the execution path is QoS of the execution path in a current periodicity, and determine that a relationship between the predicted QoS of the execution path and the preset QoS meets the preset rule.

The service deployment module is further configured to, after the path selection module determines that the relationship between the predicted QoS of the execution path and the preset QoS meets the preset rule, deploy the to-be-deployed service on the execution path.

According to a third aspect of embodiments of this application, a computing device is provided, where the computing device includes one or more processors and one or more memories. The one or more memories store one or more computer instructions, and when the computer instructions are executed by the one or more processors, the computing device is enabled to perform the method in any possible implementation of the foregoing embodiments.

According to a fourth aspect of embodiments of this application, a computer-readable storage medium is provided. The computer-readable storage medium stores instructions, and when the instructions are run on a computer, the computer is enabled to perform the method in any possible implementation of the foregoing embodiments.

BRIEF DESCRIPTION OF DRAWINGS

To describe the technical solutions in some of the embodiments of this application more clearly, the following describes the accompanying drawings for the embodiments.

DESCRIPTION OF EMBODIMENTS

Figure 1:
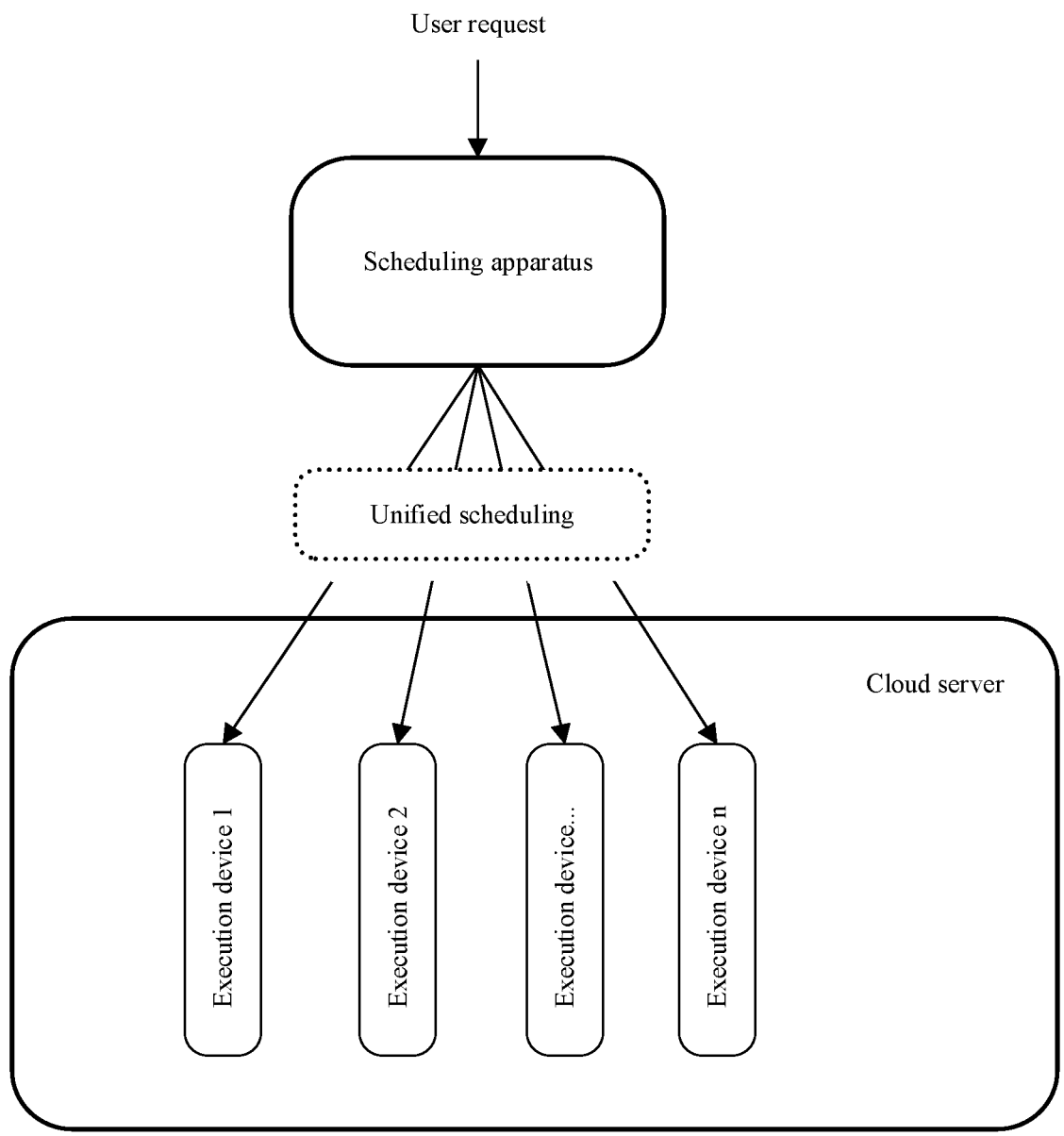
FIG. 1 is a system framework diagram according to an embodiment of this application.

The following describes the solutions in embodiments provided in this application with reference to the accompanying drawings in this application.

It should be noted that, in the specification, claims, and accompanying drawings of this application, the terms "first", "second", and the like are intended to distinguish between similar objects but do not necessarily indicate a specific order or sequence. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, product, or device.

Cloud computing is a new business service model and computing model, and provides, through the internet, various computing and storage services for a user who accesses the cloud computing. These services do not rely on a local computer, but rely on at least one cloud server. The cloud server provides computing, storage, and network resources and provides services for the user based on the resources provided by the cloud server. When the user needs to execute a to-be-deployed service, resources on the cloud server may be allocated to the to-be-deployed service based on a requirement of the to-be-deployed service. That is, based on the on-demand allocation feature of the cloud server, the resources of the cloud server may be allocated based on task requirements.

Currently, there are two conventional manners of allocating the resources of the cloud server: one manner is resource allocation based on different priority policies. That is, a to-be-deployed service with a high priority obtains more resources, and a to-be-deployed service with a low priority obtains fewer resources. However, in this manner, sufficient resources are allocated to the to-be-deployed service with a high priority for execution. This can ensure that the user has relatively high satisfaction with an execution result of the to-be-deployed service, but resources are often excessive and a waste of resources is often caused. However, the to-be-deployed service with a low priority is usually in a starvation state due to insufficient resources, and this cannot meet basic user experience. Resource differentiation caused by the priorities leads to low resource utilization. Based on this, to improve service satisfaction and resource utilization, the other manner is QoS-based resource allocation. Further, the resources are allocated based on QoS required by a specific to-be-deployed service. QoS indicates a capability of an execution device or a service to provide a service for a specific to-be-deployed service, and the QoS is a QoS value. However, an execution path is selected based on QoS of one or several execution devices. Consequently, the execution path selected by a scheduling apparatus can only roughly meet a requirement of the to-be-deployed service, but may not fully meet the requirement of the to-be-deployed service.

Before the embodiments of this application are described in detail, a diagram of a system architecture in the embodiments of this application is first described. Further, as shown in FIG. 1, a scheduling apparatus is configured to allocate resources of a cloud server based on a user request (for example, an entered to-be-deployed service) entered by a user, and is further responsible for processing a task entered by the user, saving status data, scheduling resources, and the like. The scheduling apparatus centrally schedules, based on the user request, resources included in execution devices that are involved in the user request on the cloud server. In FIG. 1, when the user enters a to-be-deployed service, the scheduling apparatus may schedule, based on specifications of resources required by the to-be-deployed service, resources included in an execution device 1, an execution device 2, . . . , and an execution device n (it is assumed that the execution devices involved in the to-be-deployed service are the execution device 1, the execution device 2, . . . , and the execution device n). It should be noted that a minimum functional unit on the cloud server may be referred to as an execution device, and specifications of resources included in the execution device are not lower than the specifications of the resources required by the to-be-deployed service. In the embodiments of this application, the execution device represents a candidate device for deploying the to-be-deployed service, and the execution path represents a candidate path for deploying the to-be-deployed service. The execution device may include a computing device, a storage device, a network device, and the like. The computing device may include a physical machine, a virtual machine, a container, and the like. It should be further noted that, the scheduling apparatus and a functional apparatus that executes a specific service may be deployed on a same cloud server. That is, corresponding software/hardware is installed on the cloud server to implement resource scheduling. Alternatively, the scheduling apparatus may be deployed on a plurality of different cloud servers. For example, a plurality of virtual machines jointly serves as the scheduling apparatus to implement resource scheduling. Alternatively, the scheduling apparatus may be independently deployed (the scheduling apparatus shown in FIG. 1 is independently deployed). This is not limited herein.

Figure 2:
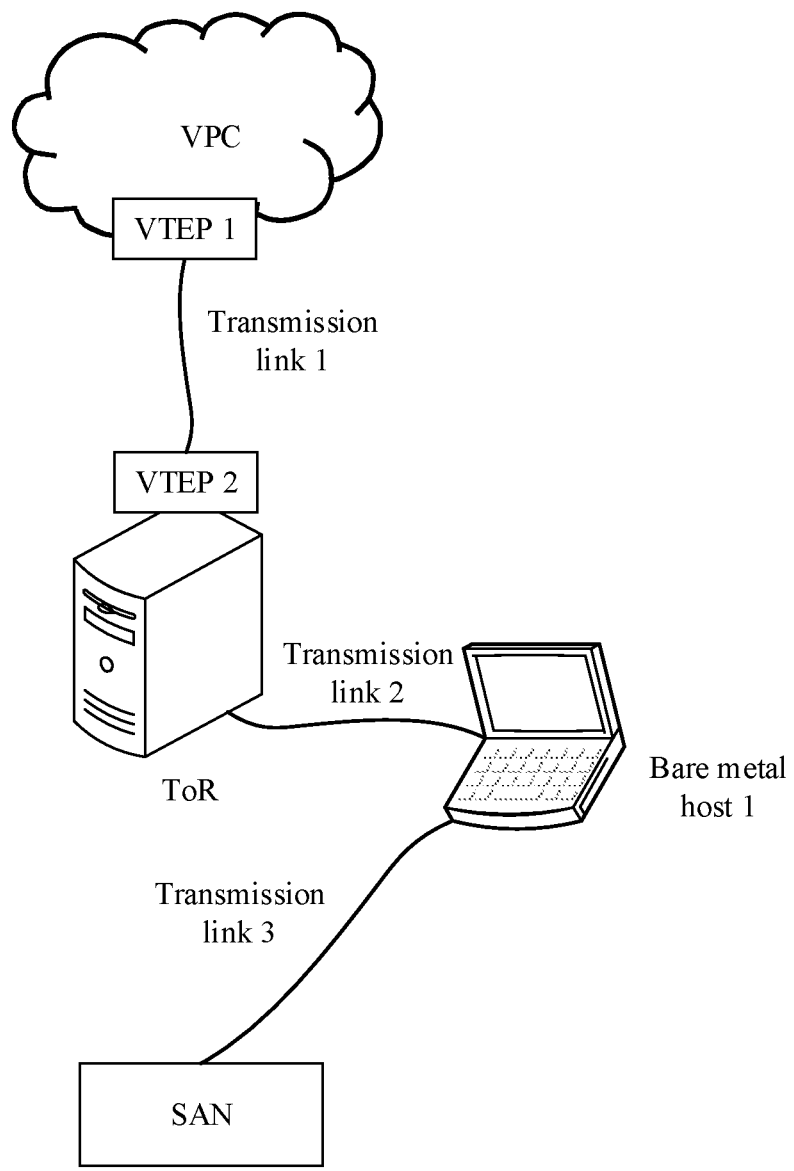
FIG. 2 is a schematic diagram of a path b1 of a service B according to an embodiment of this application.

In addition, the execution path includes execution devices through which data related to a service passes when the service is completed and transmission links between the execution devices. FIG. 2 is used as an example for description. If a service B is a storage service, and needs to be executed, data related to the service B first arrives at a virtual private cloud (VPC), and is forwarded in the VPC to a virtual tunnel endpoint (VTEP) 1 of the VPC. The VTEP 1 is connected to a VTEP 2, and the VTEP 2 may be a physical switch. An example of a physical switch such as a top of rack (ToR) is drawn in FIG. 2. The data arrives at the ToR through a transmission link 1 formed between the VTEP 1 and the VTEP 2, then arrives at a bare metal host 1 through a transmission link 2, and finally arrives at a final storage area network (SAN) through a transmission link 3. Finally, execution of the service B is completed. In this case, the VPC, the ToR, the bare metal host 1, the SAN, the transmission link 1 between the VPC and the ToR, the transmission link 2 between the ToR and the bare metal host 1, and the transmission link 3 between the bare metal host 1 and the SAN form an execution path (which may be referred to as a path b1) of the service B. The VPC, the ToR, the bare metal host 1, and the SAN are execution devices on the execution path, and the execution path of the service includes at least one execution device.

Figure 3:
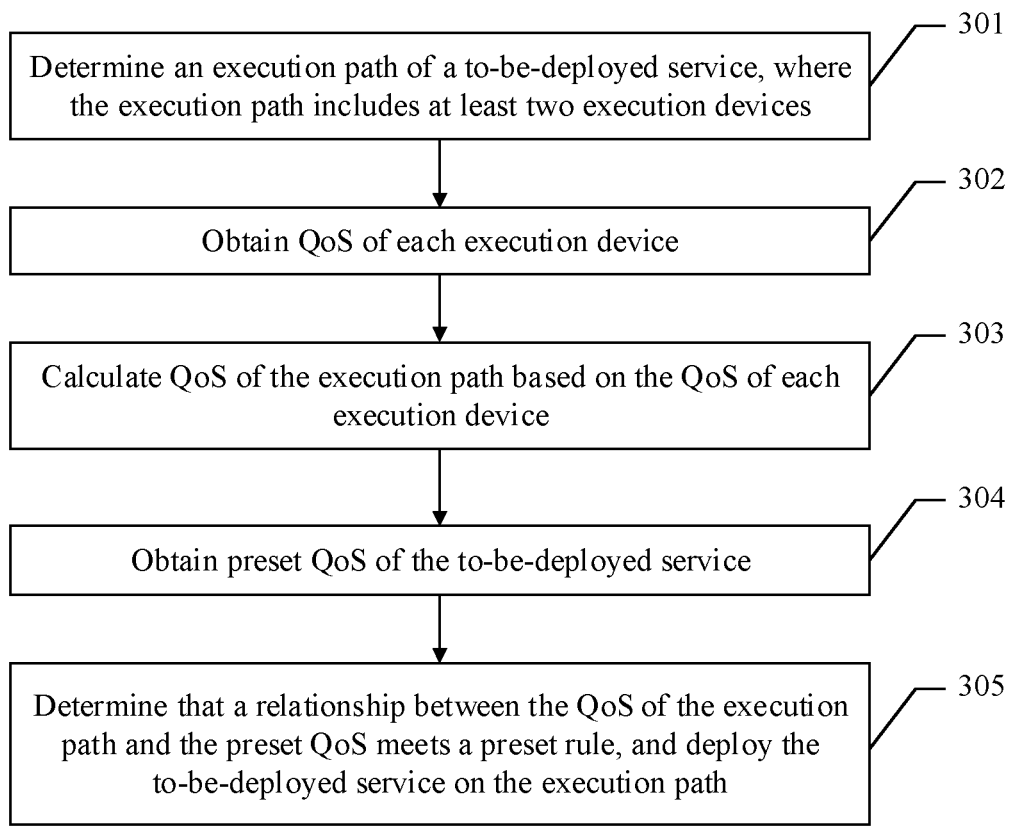
FIG. 3 is a schematic diagram of a service deployment method according to an embodiment of this application.

Refer to FIG. 3. Specific implementations of a service deployment method in an embodiment of this application are as follows.

301: Determine an execution path of a to-be-deployed service, where the execution path includes at least two execution devices.

A scheduling apparatus may determine the execution path of the to-be-deployed service in a plurality of manners. This is not limited herein. The following illustrates one of the determining manners.

When a user requests resources on a cloud server to execute the to-be-deployed service, the scheduling apparatus receives a user request, where the user request carries a service identifier of the to-be-deployed service. The scheduling apparatus obtains the service identifier, and may determine, based on the service identifier, a type (there is a mapping relationship between the service identifier and the type of resources required by the to-be-deployed service) of the resources required by the to-be-deployed service that needs to be executed by the user. In addition, the scheduling apparatus further needs to obtain specifications of the resources required by the to-be-deployed service, and then determines the execution path based on the type and the specifications of the resources required by the to-be-deployed service. A service B is used as an example. The service B is a storage service. It is assumed that the service B requires 2 gigabytes (GB) storage resources (that is, specifications of resources required by the service B are 2 GB). When the user enters the service B, the scheduling apparatus can obtain an identifier (it is assumed that the service identifier of the service B is "1122") of the service B at the same time. The scheduling apparatus can determine, based on the service identifier "1122", that a type of the resources required by the service B is storage resources, and the specifications of the resources required by the service B are 2 GB. Then, on a premise that the 2 GB storage resources are satisfied, the scheduling apparatus determines execution devices (for example, execution devices such as a VPC, ToR, a bare metal host 1, and a SAN that can provide 2 GB storage resources) that are on the cloud server and that can provide 2 GB storage resources, so that the scheduling apparatus determines a path (namely, the path b1 in FIG. 2) that is formed by the execution devices such as the VPC, the ToR, the bare metal host 1, the SAN and a transmission link 1, a transmission link 2, and a transmission link 3 between the VPC, the ToR, the bare metal host 1, and the SAN, as a path (or an execution path) on which the to-be-deployed service can be executed.

In this case, the determined execution path meets only a requirement of the resources required by the to-be-deployed service. In the following steps, the scheduling apparatus further determines whether to use the execution path as an execution path for deploying the to-be-deployed service.

302: Obtain QoS of each execution device.

After determining the execution path, the scheduling apparatus further obtains the QoS of each execution device on the execution path. The QoS of the execution device is determined based on specifications of resources included in the execution device. A quantity of resources that the execution device can provide for the to-be-deployed service is referred to as the specifications of the resources included in the execution device. The scheduling apparatus may obtain the QoS of each execution device in a plurality of manners. This is not limited herein. The following illustrates several manners of obtaining the QoS of each execution device on the execution path:

A. Calculate the QoS of each execution device on the execution path according to a QoS calculation formula.

The scheduling apparatus may send a QoS calculation formula that corresponds to each execution device (that is, one execution device corresponds to one QoS calculation formula) to a corresponding execution device, and each execution device calculates QoS of the execution device according to the received QoS calculation formula. For example, when the execution device is a physical machine, QoS of the physical machine may be calculated according to a calculation formula of central processing unit (CPU) usage, memory usage, a bandwidth, a latency, and the like of a host. Then, each execution device sends the QoS of the execution device that is calculated according to the QoS calculation formula to the scheduling apparatus.

It should be noted that the QoS calculation formula corresponding to the execution device may be preset in the scheduling apparatus. When determining each execution device on the execution path, the scheduling apparatus sends the QoS calculation formula of each execution device to the corresponding execution device. The QoS calculation formula may also be stored in a device A (including a virtual device, a physical device, and the like) connected to the scheduling apparatus. After determining the execution path, the scheduling apparatus may send a request instruction to the device A that is connected to the scheduling apparatus, where the request instruction is used to trigger the device A to send the QoS calculation formula corresponding to each execution device on the execution path to the scheduling apparatus. Then the scheduling apparatus sends each QoS calculation formula to a corresponding execution device. The QoS calculation formula may alternatively be preset in each execution device. After determining the execution path, the scheduling apparatus sends an instruction to each execution device on the execution path. The instruction is used to trigger each execution device to calculate QoS of the execution device according to the preset QoS calculation formula of the execution device. In this embodiment of this application, how the execution device obtains the QoS calculation formula is not limited.

B. Obtain the QoS of each execution device based on a mapping relationship between specifications of resources included in each execution device on the execution path and QoS of a corresponding execution device.

The scheduling apparatus may have a mapping relationship library. The mapping relationship library stores the mapping relationship between the specifications of the resources included in each execution device and the QoS of the corresponding execution device. When the scheduling apparatus needs to obtain the QoS of each execution device on the execution path, the scheduling apparatus may obtain specifications of resources included in each execution device at a current moment, and find, in the mapping relationship library, QoS of the execution device at the current moment based on the mapping relationship between the specifications of the resources included in the execution device and the QoS of the execution device. For ease of understanding, the following uses an example for description.

If the scheduling apparatus determines that an execution path of a service C is a path c, execution devices on the path c are a device a, a device b, and a device c. In this case, the scheduling apparatus needs to obtain QoS of the device a, the device b, and the device c. The scheduling apparatus first obtains specifications of resources included in the device a, the device b, and the device c at the current moment (it is assumed that the specifications of the resources included in the device a, the device b, and the device c at the current moment are x1, y2, and z3 respectively), and finds, in the mapping relationship library (Table 1 shows a mapping relationship library), the corresponding QoS (it is assumed that the QoS of the device a is a-QoS-1) of the device a when the specifications of the resources included in the device a are x1, the corresponding QoS (it is assumed the QoS of the device b is b-QoS-2) of the device b when the specifications of the resources included in the device b are y2, and the corresponding QoS (it is assumed the QoS of the device c is c-QoS-3) of the device c when the specifications of the resources included in the device c are z3. In this way, the scheduling apparatus obtains the QoS of the device a, the device b, and the device c at the current moment.

TABLE 1

| Mapping relationship library | | | | |
|---|---|---|---|---|
| Device a | x1→a-QoS-1 | x2→a-QoS-2 | x3→a-QoS-3 | ... |
| Device b | y1→b-QoS-1 | y2→b-QoS-2 | y3→b-QoS-3 | ... |
| Device c | z1→c-QoS-1 | z2→c-QoS-2 | z3→c-QoS-3 | ... |
| Device d | p1→d-QoS-1 | p2→d-QoS-2 | p3→d-QoS-3 | ... |
| Device e | q1→e-QoS-1 | q2→e-QoS-2 | q3→e-QoS-3 | ... |
| ... | ... | ... | ... | ... |

303: Calculate QoS of the execution path based on the QoS of each execution device.

After obtaining the QoS of each execution device on the execution path, the scheduling apparatus calculates the QoS of the execution path based on the QoS of each execution device. In this embodiment of this application, the QoS of the execution path is calculated in a plurality of implementations. This is not limited herein. The following illustrates several manners of calculating the QoS of the execution path.

A. Calculate an arithmetic average value of the QoS of the execution devices on the execution path.

The scheduling apparatus adds up the obtained QoS of the execution devices on the execution path, and averages the sum to obtain the QoS of the execution path. That is, the QoS (which may be denoted as path QoS) of the execution path is: path QoS=(QoS 1+QoS 2+ . . . +QoS i+ . . . +QoS n)/n, where the QoS i is QoS of the $i^{th}$ execution device on the execution path. For example, the path b1 of the service B in FIG. 2 is used as an example for description. It is assumed that QoS of the VPC that is calculated according to a corresponding calculation formula 11 is QoS 1, QoS of the ToR that is calculated according to a corresponding calculation formula 12 is QoS 2, QoS of the bare metal host 1 that is calculated according to a corresponding calculation formula 13 is QoS 3, and QoS of the SAN that is calculated according to a corresponding calculation formula 14 is QoS 4. In this case, QoS of the service B on the path b1 is: QoS of the path b1=(QoS 1+QoS 2+QoS 3+QoS 4)/4.

B. Perform a weighted summation operation on the QoS of the execution devices on the execution path.

After determining the execution path, the scheduling apparatus further determines a weight of each execution device on the execution path, where the weight of the execution device indicates an importance degree of the execution device on the execution path. Then, the scheduling apparatus performs the weighted summation operation on the QoS of the execution devices on the execution path, to obtain the QoS of the execution path. That is, the QoS (which may be denoted as path QoS) of the execution path is: path QoS=a1×QoS 1+a2×QoS 2+ . . . +ai×QoS i+ . . . +an×QoS n, where the QoS i is QoS of the $i^{th}$ execution device on the execution path, and ai is a weight of the $i^{th}$ execution device. For example, the path b1 of the service B in FIG. 2 is still used as an example for description. It is assumed that QoS of the VPC that is calculated according to a corresponding calculation formula 11 is QoS 1 and a weight of the VPC is 0.1, QoS of the ToR that is calculated according to a corresponding calculation formula 12 is QoS 2 and a weight of the ToR is 0.1, QoS of the bare metal host 1 that is calculated according to a corresponding calculation formula 13 is QoS 3 and a weight of the bare metal host 1 is 0.5, and QoS of the SAN that is calculated according to a corresponding calculation formula 14 is QoS 4 and a weight of the SAN is 0.3. In this case, QoS of the service B on the path b is: QoS of the path b1=0.1×QoS 1+0.1×QoS 2+0.5×QoS 3+0.3×QoS 4.

304: Obtain preset QoS of the to-be-deployed service.

In this embodiment of this application, the user may independently set QoS of a service (or a to-be-deployed service). The scheduling apparatus may first intelligently recommend generally used QoS (or general QoS) for the to-be-deployed service to the user based on a service type and a property of the to-be-deployed service that is entered by the user. Then the user sets the QoS of the to-be-deployed service by referring to the recommended general QoS (the user may directly use the general QoS as the preset QoS without modification, or may use the general QoS as the preset QoS after slightly adjusting the general QoS based on a preference of the user. This is not limited herein). Alternatively, the user may directly set the QoS of the to-be-deployed service based on a requirement of the user, to obtain the preset QoS. Further, a basis for setting the preset QoS is not limited herein. After the user has set the QoS of the to-be-deployed service, the scheduling apparatus may obtain the preset QoS of the to-be-deployed service.

It should be noted that step 304 may be performed before step 301, may be performed after step 303, may be performed between any two steps of step 301 to step 303, or may be performed simultaneously with any one of step 301 to step 303. This is not limited herein.

305: Determine that a relationship between the QoS of the execution path and the preset QoS meets a preset rule, and deploy the to-be-deployed service on the execution path.

After obtaining the QoS of the to-be-deployed service on the execution path and the QoS preset by the user for the to-be-deployed service, the scheduling apparatus determines whether the relationship between the QoS of the execution path and the preset QoS meets the preset rule. If the scheduling apparatus determines that the relationship between the QoS of the execution path and the preset QoS meets the preset rule, the scheduling apparatus deploys the to-be-deployed service on the execution path. It should be noted that, in this embodiment of this application, the preset rule may be that the QoS of the execution path is greater than the preset QoS, or a value obtained by subtracting the preset QoS from the QoS of the execution path is greater than a preset positive value. The preset rule is not limited herein.

This embodiment of this application first describes how to obtain the QoS of the path (that is, the execution path) on which the to-be-deployed service can be executed. Whether the to-be-deployed service is finally deployed on the execution path during execution is determined by comparing the preset QoS of the to-be-deployed service with the QoS of the execution path. In addition, this embodiment of this application further provides for the first time a solution in which the QoS of the to-be-deployed service may be set by the user. This fully considers preferences of different users for QoS of a same to-be-deployed service, and improves service satisfaction of the to-be-deployed service.

It should be noted that, in some implementations of this application, to obtain more accurate QoS of the execution path, not only the QoS of the execution devices on the execution path is considered, but also QoS of transmission links between the execution devices may be considered. That is, the scheduling apparatus may further obtain the QoS of the transmission link between the execution devices on the execution path before step 303. In this case, the QoS of the execution path obtained in step 303 is calculated based on the QoS of the execution devices on the execution path and the QoS of the transmission links on the execution path.

In this embodiment of this application, the scheduling apparatus may obtain the QoS of the execution devices on the execution path in a manner described in the embodiment corresponding to FIG. 3. Details are not described herein again. Herein, how the scheduling apparatus obtains the QoS of the transmission links is further described as follows. First, the scheduling apparatus determines the transmission links on the execution path, determines a QoS calculation formula corresponding to each transmission link, and then sends the QoS calculation formula corresponding to each transmission link to one of two execution devices on the corresponding transmission link. The execution device that obtains the QoS calculation formula calculates QoS of a corresponding transmission link, and sends the QoS of the transmission link to the scheduling apparatus. The path b1 of the service B in FIG. 2 is used as an example for description. After determining the path b1 of the service B, the scheduling apparatus may determine that transmission links of the path b1 includes a transmission link 1, a transmission link 2, and a transmission link 3, and determines that QoS calculation formulas corresponding to the transmission link 1, the transmission link 2, and the transmission link 3 are respectively a calculation formula 21, a calculation formula 22, and a calculation formula 23, where two execution devices on the transmission link 1 are the VPC and the ToR, two execution devices on the transmission link 2 are the ToR and the bare metal host 1, and two execution devices on the transmission link 3 are the bare metal host 1 and the SAN. Then, the scheduling apparatus may send the calculation formula 21 to the VPC or the ToR (it is assumed that the calculation formula is sent to the VPC), send the calculation formula 22 to the ToR or the bare metal host 1 (it is assumed that the calculation formula is sent to the bare metal host 1), and send the calculation formula 23 to the bare metal host 1 or the SAN (it is assumed that the calculation formula is sent to the SAN). Then, the VPC, the bare metal host 1, and the SAN respectively calculate QoS of the transmission link 1, the transmission link 2, and the transmission link 3 according to the calculation formula 21, the calculation formula 22, and the calculation formula 23. Finally, the VPC, the bare metal host 1, and the SAN respectively send the obtained QoS of the three-transmission links to the scheduling apparatus.

It should be noted that, in some implementations of this application, the scheduling apparatus may further send a QoS calculation formula corresponding to a transmission link to two execution devices on the transmission link, so that the two execution devices both calculate QoS of the same transmission link. When the two execution devices send the two QoSs of the transmission link to the scheduling apparatus, the scheduling apparatus takes an arithmetic average value of the obtained two QoSs of the same transmission link as QoS of the transmission link on the execution path. In this embodiment of this application, in addition to the QoS of the execution devices on the execution path, the scheduling apparatus further obtains the QoS of the transmission link between the execution devices, and determines the QoS of the execution path based on the QoS of the execution devices and the QoS of the transmission link, so that the calculated QoS of the entire execution path is more accurate.

It should be noted herein that, in the foregoing embodiments of this application, the scheduling apparatus may determine the execution path according to but is not limited to the following manner. First, the scheduling apparatus determines N (N≥1) execution paths based on the service identifier, where specifications of resources included in execution devices on each execution path are not lower than specifications of resources required by the to-be-deployed service. For a method for determining QoS of each of the N execution paths by the scheduling apparatus and a method for obtaining the QoS of each execution path by the scheduling apparatus, refer to steps 301 to 305 in the foregoing embodiment. Details are not described herein. In other words, the scheduling apparatus first determines several execution paths (for example, a path d1, a path d2, and a path d3 can provide, for a service D, bandwidth resources with specifications not lower than 100 kilobits per second (kbps)) based on the specifications (for example, specifications of bandwidth resources required by the service D are not lower than 100 kbps) of the resources required by the to-be-deployed service. Herein, how to determine the execution path on which the to-be-deployed service is finally deployed needs to be described in several cases.

A. When N=1, there is only one execution path.

The service B corresponding to FIG. 2 is used as an example for description. If the scheduling apparatus determines that only the path b1 meets a resource value (it is assumed that the resource value required by the service B is 2 GB of storage resources) required by the service B, the scheduling apparatus may directly obtain the QoS of the path b1 according to the manner of obtaining the QoS of the execution path described in the foregoing embodiment, and compare the QoS of the path b1 with preset QoS set by the user for the service B. If the QoS of the path b1 and the preset QoS of the service B meet the preset rule, the scheduling apparatus deploys the service B on the path b1.

B. When N≥2, there are at least two execution paths.

The service B corresponding to FIG. 2 is still used as an example for description. If the scheduling apparatus determines that execution paths that meet a resource value required by the service B include not only the path b1, but also a path b2 and a path b3, the execution path of the service B is any one of the three execution paths. In this case, the scheduling apparatus may separately obtain QoS of the path b1, the path b2, and the path b3 according to the manner of obtaining the QoS of the execution path in the foregoing embodiment, then compare the obtained QoS of each of the path b1, the path b2, and the path b3 with preset QoS preset by the user for the service B, and determine, based on a comparison result, an execution path on which the service B is finally deployed. The following is described based on the comparison result.

a. If the scheduling apparatus determines that a relationship between QoS of only one of the N execution paths and the preset QoS meets the preset rule, the scheduling apparatus deploys the to-be-deployed service on the execution path.

The service B corresponding to FIG. 2 is still used as an example for description. If a relationship between the QoS of only one (for example, the path b1) of the path b1, the path b2, and the path b3 and the preset QoS meets the preset rule, the scheduling apparatus deploys the service B on the path b1.

It should be noted that, in some implementations of this application, to make the to-be-deployed service more stable during execution (for example, the target execution path does not need to be frequently switched), the scheduling apparatus may further perform prediction on the QoS (the QoS of the execution path mentioned above is QoS of the execution path in a current periodicity) of the execution path to obtain predicted QoS of the execution path in a next periodicity. After determining that a relationship between the predicted QoS of the execution path and the preset QoS of the to-be-deployed service also meets the preset rule, the scheduling apparatus deploys the to-be-deployed service on the execution path. The service B is used as an example. The scheduling apparatus may further perform prediction on the QoS of the path b1 to obtain predicted QoS of the path b1 in a next periodicity. After determining that a relationship between the predicted QoS of the path b1 and the preset QoS of the service B also meets the preset rule, the scheduling apparatus deploys the service B on the path b1.

b. If the scheduling apparatus determines that a relationship between QoS of at least two of the N execution paths and the preset QoS meets the preset rule, the scheduling apparatus deploys the service on one of the at least two execution paths.

The service B corresponding to FIG. 2 is still used as an example for description. If a relationship between QoS of some (for example, the path b1 and the path b2) or all of the path b1, the path b2, and the path b3 and the preset QoS meets the preset rule (the execution paths that meet the preset rule may be collectively referred to as to-be-selected execution paths), a to-be-deployed execution path of the service B may be determined in the following manners:

(1) Determine specifications of resources included in execution devices on each to-be-selected execution path, and deploy the service B on an execution path on which the execution devices have a largest quantity of resources.

(2) Deploy the service B on an execution path with best QoS in the to-be-selected execution paths.

(3) Deploy the service B on an execution path that is in the to-be-selected execution paths and that has a smallest quantity of transmission links.

(4) Predict QoS of all the to-be-selected execution paths in the next periodicity to obtain predicted QoS of each to-be-selected execution path. If the scheduling apparatus determines that a relationship between the preset QoS and predicted QoS (which may be referred to as target predicted QoS) in the predicted QoS of all the to-be-selected execution paths meets the preset rule, when there is only one target predicted QoS, the scheduling apparatus deploys the service B on the to-be-selected execution path corresponding to the target predicted QoS. When there are at least two target predicted QoSs, the scheduling apparatus may deploy the service B on a corresponding execution path in a manner similar to the foregoing manners (1), (2), (3), and (4). It can be learned from the foregoing description that, when the scheduling apparatus determines that a relationship between the QoS of the plurality of execution paths and the preset QoS meets the preset rule, there are a plurality of implementations of determining one execution path from the plurality of execution paths as the execution path for deploying the to-be-deployed service. This is not limited herein.

c. If the scheduling apparatus determines that the relationship between the QoS of each of the N execution paths and the preset QoS does not meet the preset rule, the scheduling apparatus performs resource adjustment.

If the scheduling apparatus determines that the relationship between the QoS of each of the N execution paths and the preset QoS does not meet the preset rule, the scheduling apparatus may adjust the resources of the N execution paths based on the resource value required by the to-be-deployed service, adjust specifications of resources in execution devices on any execution path until an execution path (which may be referred to as an adjusted execution path) that meets a preset QoS condition is obtained, and then deploy the to-be-deployed service on the adjusted execution path.

Figure 4:
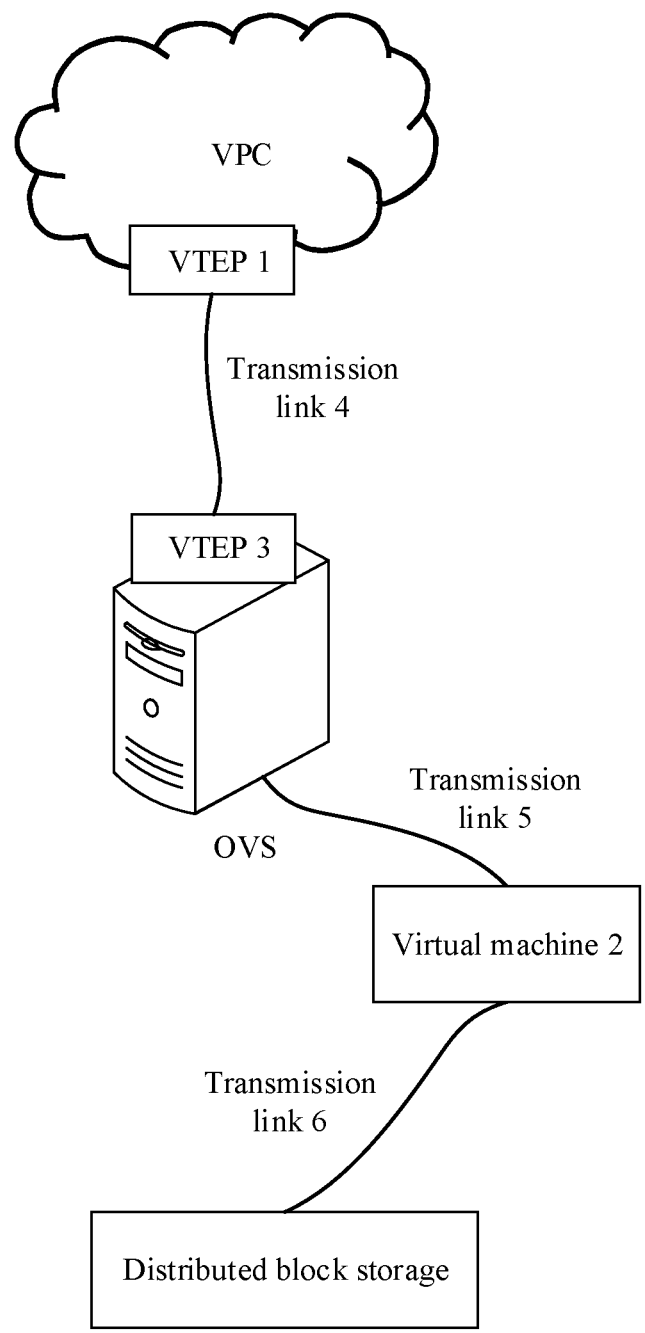
FIG. 4 is a schematic diagram of a path b2 of a service B after resource adjustment performed by a scheduling apparatus according to an embodiment of this application.

The service B corresponding to FIG. 2 is still used as an example for description. If the scheduling apparatus finds that a relationship between QoS of the service B that is calculated on each optional execution path (for example, the path b1, the path b2, and the path b3) and the preset QoS does not meet the preset rule, backend resource adjustment is triggered. The backend of the scheduling apparatus may reduce, by migration, suspension, limitation, or the like, usage of resources occupied by each execution device on the execution path of another service (for example, the service D and the service E) that is deployed on the optional execution path of the service B, to reduce contention of resources of the service B, and upgrades the QoS of the service B on the execution devices, so that the QoS of the service B on an execution path formed by the execution devices is also upgraded. That is, the QoS of the service B on the execution path may be upgraded by changing resource reservation or reducing resource contention of another service on the execution devices on the execution path. It should be noted that, a manner in which the scheduling apparatus performs resource adjustment may include that the scheduling apparatus increases the specifications of the resources included in the execution devices on the execution path by migration, suspension, limitation, or the like to upgrade the QoS of the execution devices. In addition, the scheduling apparatus may further add additional resources to the execution devices on the execution path, to upgrade the QoS of the execution devices. A resource adjustment manner is not limited herein. Then, after the resource adjustment, QoS of each optional execution path (namely, the path b1, the path b2, and the path b3) of the service B may be changed, the changed QoS of each execution path is compared with the preset QoS. If the scheduling apparatus determines that a relationship between QoS of at least one execution path after the resource adjustment and the preset QoS meets the preset rule, the scheduling apparatus may determine the to-be-deployed execution path of the service B in a similar manner in the foregoing embodiment. Alternatively, if the scheduling apparatus determines that a relationship between QoS of any execution path after the resource adjustment and the preset QoS still does not meet the preset rule, the scheduling apparatus continues to perform the resource adjustment until a relationship between QoS of at least one execution path after the resource adjustment and the preset QoS meets the preset rule. FIG. 4 is used as an example for description. After the resource adjustment, the scheduling apparatus determines that a relationship between QoS of the path b2 of the service B and the preset QoS meets the preset rule, and then deploys the service B on the path b2. The path b2 includes a VPC, a high-quality multi-layer open virtual switch (OVS), a virtual machine 2, distributed block storage, a transmission link 4 connecting a VTEP 3 of the OVS and a VTEP 1 of the VPC, a transmission link 5 connecting the OVS and the virtual machine 2, and a transmission link 6 connecting the virtual machine 2 and the distributed block storage.

A process of determining the to-be-deployed execution path of the to-be-deployed service in the foregoing embodiment is as follows. The scheduling apparatus first determines, based on the identifier of the to-be-deployed service, the N execution paths that meet the specifications of the resources required by the to-be-deployed service, calculates N QoSs of the N execution paths, further determines that relationships between the preset QoS and several QoSs in the N QoSs meet the preset rule (it is assumed that W QoSs meet the preset rule), finally, selects an execution path corresponding to one of the W QoSs in the foregoing determining manner, and deploys the to-be-deployed service on the selected execution path.

It should be noted that, in some other implementations of this application, after determining the N execution paths, the scheduling apparatus may calculate the QoS of the N execution paths one by one according to a preset method. Each time the scheduling apparatus calculates QoS of one execution path, the scheduling apparatus compares the QoS of the execution path with the preset QoS. When determining that a relationship between the QoS of the execution path and the preset QoS meets the preset rule, the scheduling apparatus directly deploys the to-be-deployed service on the execution path that meets the requirement, and no longer calculates QoS of remaining execution paths. This reduces a calculation amount. For ease of understanding, the service B corresponding to FIG. 2 is used as an example for description. If the scheduling apparatus determines, based on a corresponding service identifier, that there are three optional execution paths (that is, N=3) for the service B currently, which are the path b1, the path b2, and the path b3, the scheduling apparatus determines, according to the preset method (it is assumed that the preset method is that QoS of an execution path that is first determined is first calculated), that a sequence of calculating the QoS of the three execution paths is as follows: the QoS of the path b1, the QoS of the path b2, and the QoS of the path b3. In this case, the scheduling apparatus first calculates the QoS of the path b1, and then compares the QoS of the path b1 with the preset QoS. Assuming that a comparison result is that a relationship between the QoS of the path b1 and the preset QoS does not meet the preset rule, the scheduling apparatus continues to calculate the QoS of the path b2, and then compares the QoS of the path b2 with the preset QoS. Assuming that a comparison result is that a relationship between the QoS of the path b2 and the preset QoS meets the preset rule, the scheduling apparatus directly determines that the path b2 is a to-be-deployed path of the service B, deploys the service B on the path b2, and does not calculate the QoS of the path b3.

It should be further noted that, in some implementations of this application, the scheduling apparatus may further directly determine an execution path based on the specifications of the resources required by the to-be-deployed service (that is, the scheduling apparatus does not need to determine the N execution paths that meet the specifications of the resources of the to-be-deployed first). Each time determining an execution path, the scheduling apparatus calculates QoS of the execution path, and compares the QoS of the execution path with the preset QoS. If the scheduling apparatus determines that a relationship between the QoS of the execution path and the preset QoS meets the preset rule, the scheduling apparatus directly determines that the execution path is the to-be-deployed execution path of the to-be-deployed service, deploys the to-be-deployed service on this execution path, and no longer determines whether there is another execution path meets the specifications of the resources required by the to-be-deployed service. The service B corresponding to FIG. 2 is still used as an example for description. If the scheduling apparatus first determines an execution path (it is assumed that the execution path is the path b1) of the current service B based on specifications of resources required by the service B, the scheduling apparatus directly calculates the QoS of the path b1, and compares the QoS of the path b1 with the preset QoS. If a comparison result is that a relationship between the QoS of the path b1 and the preset QoS does not meet the preset rule, the scheduling apparatus continues to determine another execution path (it is assumed that the execution path is the path b2) of the service B based on the specifications of the resources required by the service B, and calculates the QoS of the path b2. If a comparison result is that a relationship between the QoS of the path b2 and the preset QoS meets the preset rule, the scheduling apparatus directly determines that the path b2 is the to-be-deployed execution path of the service B, deploys the service B on the path b2, and no longer determines whether there is another execution path can meet the specifications of the resources required by the service B.

It can be learned from FIG. 1 and FIG. 4 that, when the scheduling apparatus determines that a relationship between QoS of each of all optional execution paths (that is, the N execution paths) of the to-be-deployed service and the preset QoS does not meet the preset rule, the scheduling apparatus performs the resource adjustment to implement scheduling across execution paths such as a virtual machine, a container, and a physical machine. However, an existing cloud server cannot implement this. A distributed resource scheduler (DRS) system is used as an example. The DRS system can only implement virtual machine migration based on host performance, but cannot implement centralized scheduling across the virtual machine, the container, and the physical machine. A virtual machine VMware is used as an example. A DRS of the VMware can perform backend resource adjustment only based on a basic CPU and memory, but cannot switch and adjust an execution path of a to-be-deployed service.

It should be noted that, in some implementations of this application, the scheduling apparatus may classify execution paths of all services that can be executed on the cloud server in advance. For example, the scheduling apparatus classifies execution paths that can provide high storage resources into a category, classifies execution paths that can provide high network resources into a category, classifies execution paths that can provide high compute resources into a category, and the like. The execution paths in each category may be classified into several subcategories based on a range of resources that can be provided. Each category and each subcategory have a corresponding identifier. In this way, when a to-be-deployed service needs to be deployed, based on specifications of resources required by the to-be-deployed service, the scheduling apparatus may more quickly determine, based on category identifiers, all optional execution paths (that is, N execution paths) that meet the specifications of the resources required by the to-be-deployed service. This improves a speed at which the scheduling apparatus determines an execution path for deploying the to-be-deployed service.

It should be further noted that, in some implementations of this application, the scheduling apparatus may adjust resources of execution devices on an execution path, to upgrade QoS that is calculated by the execution devices according to QoS calculation formulas, and the scheduling apparatus may further adjust the QoS calculation formulas corresponding to the execution devices, to upgrade QoS of the execution devices. A premise of adjusting the QoS calculation formulas by the scheduling apparatus is that specifications of resources included in the execution path for the to-be-deployed service are actually sufficient, but the resources included in the execution devices are not fully utilized only due to different selections on which the QoS calculation formulas are based. For example, QoS of a host of the execution device may be calculated according to a QoS calculation formula of CPU usage, memory usage, a bandwidth, a latency, and the like of the host. The QoS calculation formulas vary depending on selections such as the CPU usage, the memory usage, the bandwidth, and the latency.

Figure 5:
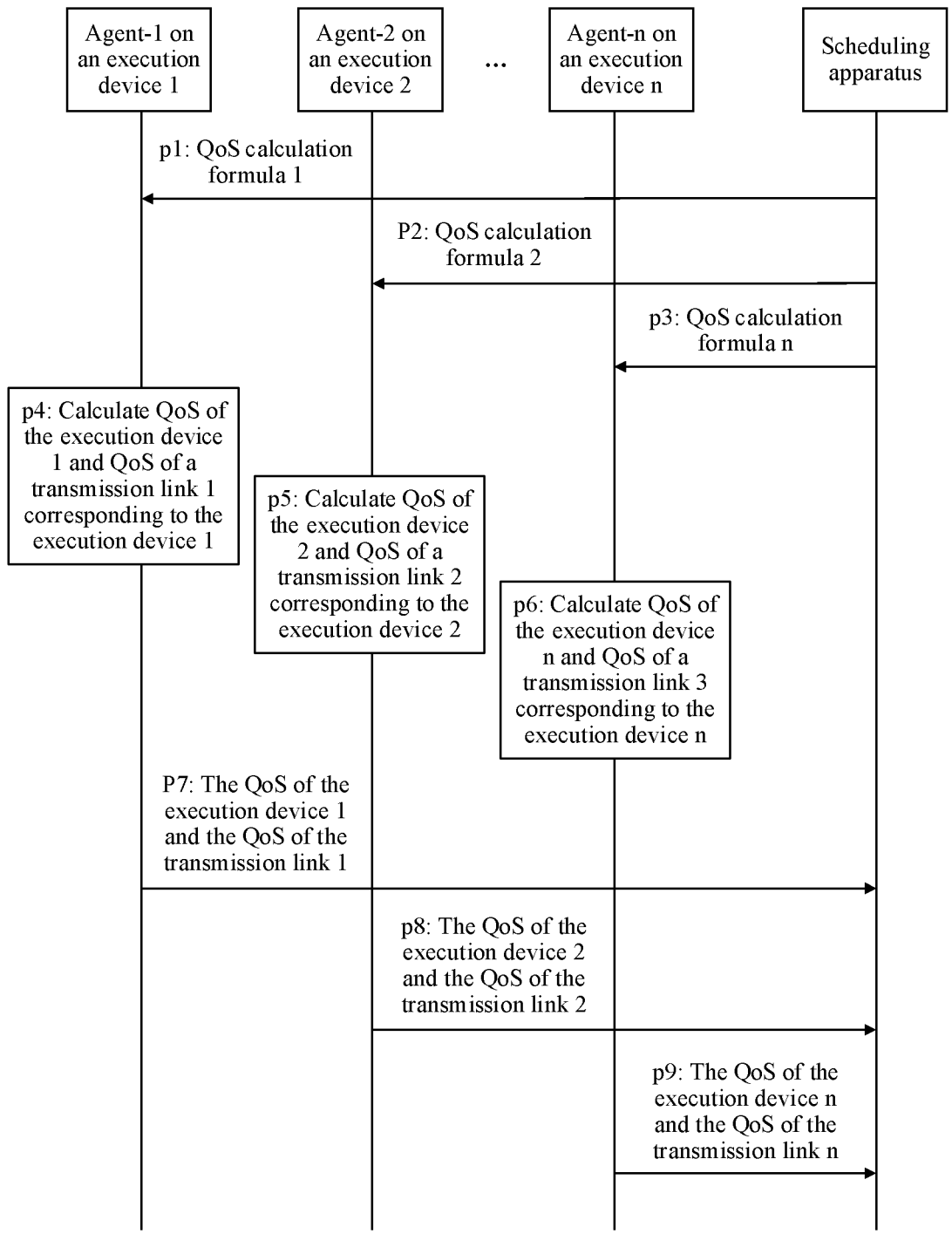
FIG. 5 is a schematic flowchart of reporting QoS to a scheduling apparatus according to an embodiment of this application.

It should be noted that, in some implementations of this application, the execution device may obtain, through an agent (which is a software/hardware entity) embedded in the execution device, a QoS calculation formula corresponding to the execution device and/or a QoS calculation formula corresponding to a transmission link that are/is sent by the scheduling apparatus, and send, back to the scheduling apparatus, QoS of the execution device and/or QoS of the transmission link that are/is calculated according to the QoS calculation formulas. FIG. 5 is used as an example for description. If the scheduling apparatus determines P execution paths based on a resource value required by a service E, where P≥1, the P execution paths include n execution devices. Agents are embedded in the n execution devices, and may be denoted as an agent-1, an agent-2, . . . , and an agent-n. After determining the n execution devices on the P execution paths, the scheduling apparatus sends, to the agents of the corresponding execution devices, QoS calculation formulas (including a QoS calculation formula corresponding to each execution device and/or a QoS calculation formula corresponding to each transmission link) corresponding to the execution devices. That is, steps p1 to p3 in FIG. 5 are performed: p1: Send, to the agent-1 on an execution device 1, QoS calculation formulas 1 (including a QoS calculation formula 1 of the execution device 1 and/or a QoS calculation formula 1 of a transmission link 1 corresponding to the execution device 1) corresponding to the execution device 1, p2: Send, to the agent-2 on an execution device 2, QoS calculation formulas 2 (including a QoS calculation formula 2 of the execution device 2 and/or a QoS calculation formula 2 of a transmission link 2 corresponding to the execution device 2) corresponding to the execution device 2, . . . , p3: Send, to the agent-n on an execution device n, QoS calculation formulas n (including a QoS calculation formula n of the execution device n and/or a QoS calculation formula n of a transmission link n corresponding to the execution device n) corresponding to the execution device n. After obtaining the corresponding QoS calculation formula, the agent on each execution device obtains QoS of the corresponding execution device according to the QoS calculation formula (if the QoS calculation formula includes only the QoS calculation formula corresponding to the execution device) and QoS of the transmission link corresponding to the execution device (if the QoS calculation formula includes the QoS calculation formula corresponding to the execution device and the QoS calculation formula corresponding to the transmission link). That is, steps p4 to p6 in FIG. 5 are performed (an example in which the QoS calculation formula includes the QoS calculation formula corresponding to the execution device and the QoS calculation formula corresponding to the transmission link is used for illustration): p4: The agent-1 calculates QoS of the execution device 1 and QoS of the transmission link 1 corresponding to the execution device 1, p5: The agent-2 calculates QoS of the execution device 2 and QoS of the transmission link 2 corresponding to the execution device 2, . . . , p6: The agent-n calculates QoS of the execution device n and QoS of the transmission link 3 corresponding to the execution device n. Finally, each device sends the calculated QoS of the execution device and the calculated QoS of the transmission link corresponding to the execution device to the scheduling apparatus. That is, steps p7 to p9 in FIG. 5 are performed: p7: The agent-1 sends the QoS of the execution device 1 and the QoS of the transmission link 1 to the scheduling apparatus, p8: The agent-2 sends the QoS of the execution device 2 and the QoS of the transmission link 2 to the scheduling apparatus, . . . , p9: The agent-n sends the QoS of the execution device n and the QoS of the transmission link n to the scheduling apparatus. Finally, the scheduling apparatus may calculate QoS of the service E on the P execution paths based on the QoS of the execution devices and the QoS of the transmission links. It should be noted that, in FIG. 5, there is no sequence between steps p1 to p3, steps p4 to p6, and steps p7 to p9, provided that step p7 is performed after step p4, step p4 is performed after step p1, step p8 is performed after step p5, step p5 is performed after step p2, step p9 is performed after step p6, and step p6 is performed after step p3. This is not limited herein.

In this embodiment of this application, because minimum functional units of all devices (including a virtual machine, a physical machine, and a container) on a cloud server during execution of a service may be referred to as execution devices, the scheduling apparatus sends and receives the QoS calculation formulas, and calculates and sends QoS through the agents embedded in the execution devices. This facilitates centralized management. If a new execution device needs to be added to the cloud server, centralized management can be implemented only by embedding an agent in the newly added execution device, and this is simple and convenient.

Figure 6A:
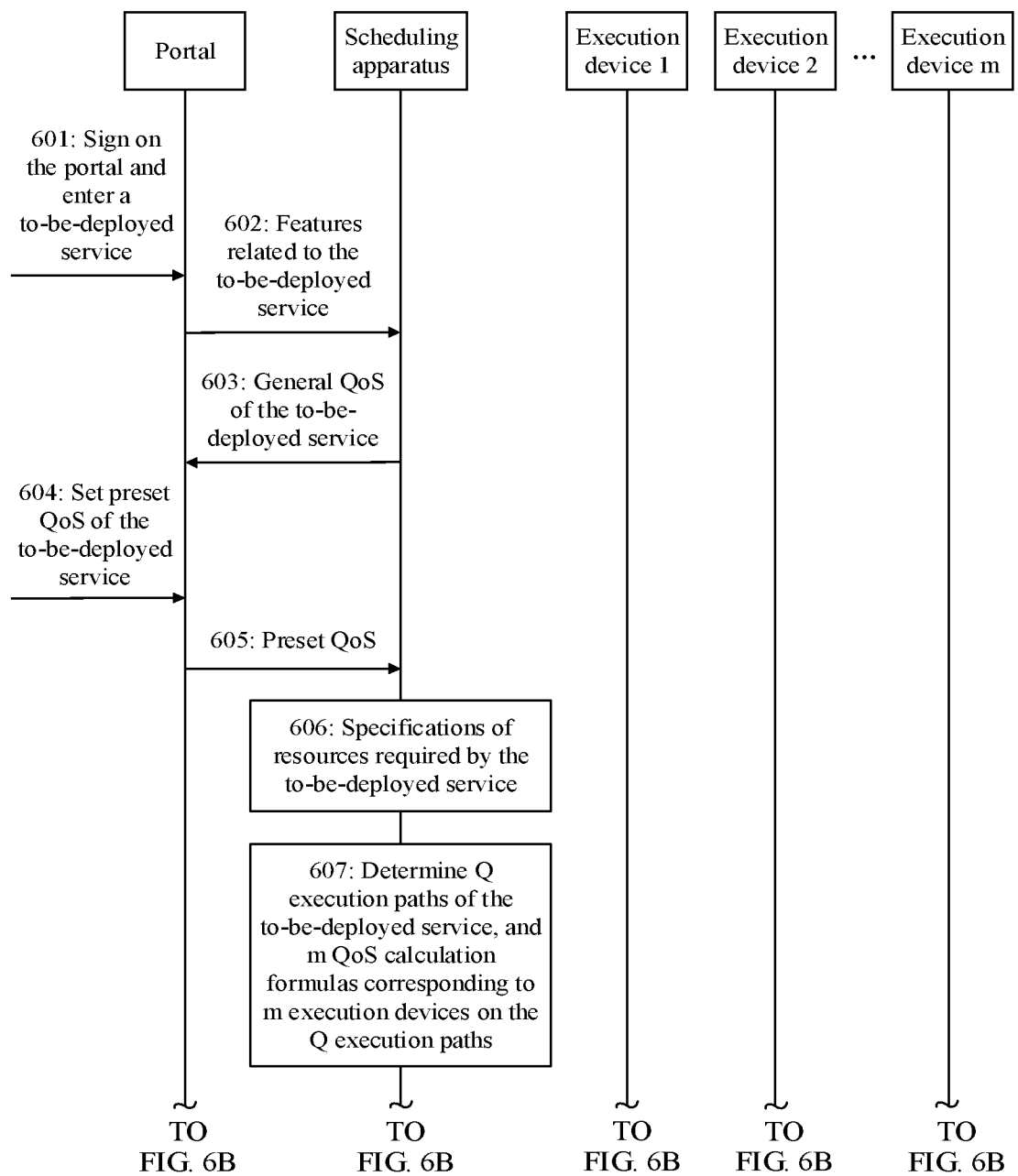
FIG. 6A and FIG. 6B are schematic diagrams of a service deployment method according to an embodiment of this application.
Figure 6B:
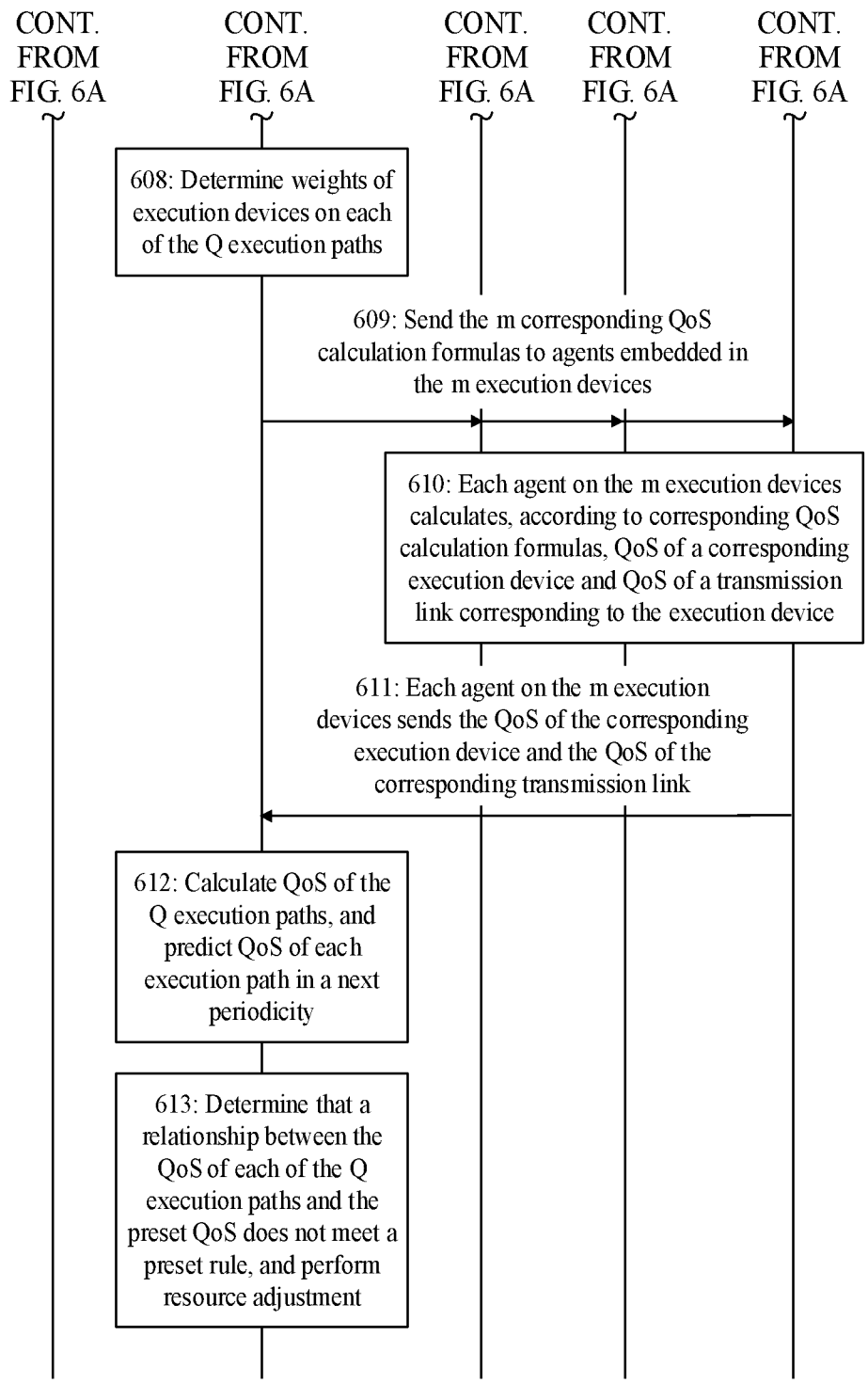

For ease of understanding, the following describes in detail a specific embodiment of a service deployment method starting from setting QoS of a to-be-deployed service by a user. Details are shown in FIG. 6A and FIG. 6B.

601: Sign on a portal and enter the to-be-deployed service.

The user signs on the portal (the portal is a portal web, and is a web-based application that mainly provides personalization, single sign-on, content integration of different sources, and a presentation layer for storing an information system), and enters the to-be-deployed service.

602: A scheduling apparatus obtains related features of the to-be-deployed service.

After the user enters the to-be-deployed service through the portal, the scheduling apparatus may obtain the related features such as a type, a property, and a priority of the to-be-deployed service.

603: The scheduling apparatus intelligently recommends general QoS of the to-be-deployed service to the user.

The scheduling apparatus intelligently recommends the general QoS of the to-be-deployed service, namely, the QoS commonly used when most users execute the to-be-deployed service, to the user based on the related features of the to-be-deployed service.

604: The user sets preset QoS of the to-be-deployed service.

The user sets the QoS of the to-be-deployed service with reference to the general QoS recommended by the scheduling apparatus. For example, the user may directly use the general QoS as the preset QoS without modification, or may use the general QoS as the preset QoS after slightly adjusting the general QoS based on a preference of the user. This is not limited herein.

In some implementations of this application, if the user does not need to refer to the general QoS, step 603 may be skipped, and the user may directly set the QoS of the to-be-deployed service based on a requirement of the user, to obtain the preset QoS.

605: The scheduling apparatus obtains the preset QoS set by the user.

After the user has set the QoS of the to-be-deployed service, the scheduling apparatus may obtain the preset QoS of the to-be-deployed service.

606: The scheduling apparatus determines specifications of resources required by the to-be-deployed service.

The scheduling apparatus may further determine the specifications of the resources required by the to-be-deployed service based on the obtained related features of the to-be-deployed service. It should be noted that step 606 may be performed after step 602 to step 605, and step 606 may also be performed between any two steps in step 602 to step 605. This is not limited herein.

607: The scheduling apparatus determines Q execution paths of the to-be-deployed service and m QoS calculation formulas corresponding to m execution devices on the Q execution paths.

After determining a resource value required by the to-be-deployed service, the scheduling apparatus automatically generates, based on an overall system status of a cloud server, the Q execution paths ($Q \geq 1$) that meet the specifications of the resources required by the to-be-deployed service, and further determines the m execution devices included in the Q execution paths and the m QoS calculation formulas corresponding to the m execution devices, where the m QoS calculation formulas include m QoS calculation formulas corresponding to the m execution devices and QoS calculation formulas corresponding to m transmission links. The QoS calculation formulas corresponding to the execution devices are used to calculate QoS of the corresponding execution devices, and the QoS calculation formulas corresponding to the transmission links are used to calculate QoS of the transmission links corresponding to the execution devices. In this embodiment of this application, definitions of the QoS calculation formula corresponding to the execution device and the QoS calculation formula corresponding to the transmission link are described in the embodiment corresponding to FIG. 3. Details are not described herein again.

608: The scheduling apparatus determines weights of execution devices on each of the Q execution paths.

After determining the execution devices on each of the Q execution paths, the scheduling apparatus further determines the weight of each execution device, where the weight of the execution device indicates an importance degree of the execution device on a corresponding execution path.

609: The scheduling apparatus sends the m corresponding QoS calculation formulas to agents embedded in the m execution devices.

In this embodiment of this application, an agent is embedded in each execution device on the cloud server, and the execution device sends and receives the QoS calculation formula, and calculates and sends the QoS through the embedded agent. After the scheduling apparatus determines the m execution devices of the Q execution paths, the scheduling apparatus sends, to the agents of the m execution devices, the QoS calculation formulas corresponding to the m execution devices.

610: Each agent on the m execution devices calculates, according to corresponding QoS calculation formulas, QoS of a corresponding execution device and QoS of a transmission link corresponding to the execution device.

After obtaining the corresponding QoS calculation formulas, each agent on the m execution devices calculates, according to the QoS calculation formulas, the QoS of the corresponding execution device and the QoS of the transmission link corresponding to the execution device. In this embodiment of this application, how the agent on the execution device obtains, according to the QoS calculation formulas, the QoS of the corresponding execution device and the QoS of the transmission link corresponding to the execution device is similar to a manner of calculating the QoS of the execution device and the QoS of the transmission link in the embodiment corresponding to FIG. 3. Details are not described herein again.

611: Each agent on the m execution devices sends the QoS of the corresponding execution device and the QoS of the corresponding transmission link to the scheduling apparatus.

Each agent on the m execution devices sends, to the scheduling apparatus, the QoS of the corresponding execution device and the QoS of the corresponding transmission link that are obtained according to the QoS calculation formulas.

612: The scheduling apparatus calculates QoS of the Q execution paths, and predicts QoS of each execution path in a next periodicity.

The scheduling apparatus calculates the QoS of the Q execution paths based on the obtained QoS of the m execution devices and the obtained QoS of the corresponding transmission links, and predicts the QoS of each execution path in the next periodicity. In this embodiment of this application, how the scheduling apparatus calculates the QoS of the Q execution paths is similar to a manner of calculating the QoS of the execution path in the embodiment corresponding to FIG. 3. Details are not described herein again.

In this embodiment of this application, if a relationship between QoS of at least one of the Q execution paths and the preset QoS meets a preset rule, a final execution path of the to-be-deployed service may be determined according to the solution described in the foregoing embodiment. Details are not described herein. In this embodiment of this application, the scheduling apparatus determines an execution path as a to-be-deployed execution path of the to-be-deployed service based on QoS of the execution path in a current periodicity, execution devices on the execution path not only run the to-be-deployed service, but may also run another service. Therefore, resources included in the execution devices may change. If the scheduling apparatus finds, in a process of executing the to-be-deployed service, that the selected execution path cannot meet a resource requirement of the to-be-deployed service, the scheduling apparatus needs to perform a non-prediction-based backend adjustment on the resources on the execution path. For example, when data of a service F is transmitted to an execution path such as a unified load balancer, the scheduling apparatus finds that virtual machine resources at the backend of the execution path are insufficient, so that a requirement for latency calculation of the service F cannot be met. In this case, the unified load balancer automatically forwards the service F to a physical machine for calculation. The scheduling apparatus may further predict QoS of each execution path in the next periodicity. For example, in the process of executing the to-be-deployed service, if the scheduling apparatus finds that the QoS that is in the next periodicity and that is of the execution path on which the to-be-deployed service is deployed cannot meet the preset rule, the scheduling apparatus may adjust the execution path of the to-be-deployed service based on the predicted QoS of each execution path in the next periodicity to an execution path whose QoS meets the preset rule in the next periodicity, so as to ensure continuity and stability of the to-be-deployed service.

613: If a relationship between the QoS of each of the Q execution paths and the preset QoS does not meet the preset rule, the scheduling apparatus performs resource adjustment.

If the scheduling apparatus determines that the relationship between the calculated QoS of each of the Q execution paths and the preset QoS does not meet the preset rule, the scheduling apparatus performs the resource adjustment, that is, adjust specifications of resources of execution devices on any execution path until an execution path (or the adjusted execution path) that meets a preset QoS condition is obtained, and deploys the to-be-deployed service on the adjusted execution path. A manner in which the scheduling apparatus performs the resource adjustment is similar to the manner in which the scheduling apparatus performs the resource adjustment in the foregoing embodiment. Details are not described herein again.

For the preset QoS that is set by the user for the to-be-deployed service, execution paths may be different due to different compute resources. A solving model of an execution path is used as an example as follows by using latency as QoS and compute resources and network resources as impact.

$$\delta = \Phi(c)\vartheta(r) \times \gamma(c,r)$$

$\delta$ is a completion degree (in %) of a task, namely, a probability of ensuring completion of the to-be-deployed service, $\Phi$ is a probability density of the compute resources, $\vartheta$ is a probability density of the network resources, and $\gamma$ is a joint influence function, and is defined as $\gamma(c, r)=(t(c, r))/t^-$, where $t^-$ is average execution time (in microsecond) of the task, and $t(c, r)$ is execution time corresponding to the compute resources and network resources at $(c, r)$.

For a single task request, $c=[c\_1, c\_2, \ldots, c\_n]$ and $r=[r\_1, r\_2, \ldots, r\_n]$ are defined, a completion degree is $[\delta=[\delta\_1, \delta\_2, \ldots, \delta\_n]^T$, and total execution time of a task (for example, an HTTP request) is $t=[t\_(1)\ \delta^{\wedge}(-1), t\_2\ \delta^{\wedge}(-1), \ldots, t\_i\ \delta^{\wedge}(-1), \ldots, t\_n\ \delta^{\wedge}(-1)]^{\wedge}\tau$, where $t\_(i)$ represents average execution time of the single task. $\emptyset=[\emptyset\_(c^{\wedge}1,)\ \emptyset\_(c^{\wedge}2,) \ldots, \emptyset\_(c^{\wedge}n)]\tau$, $\vartheta=[\vartheta\_(r^{\wedge}1,)\ \vartheta\_(r^{\wedge}2,) \ldots, \vartheta\_(r^{\wedge}n)]\tau$. Matrix parameters c and r are solved in the following manner determining that an objective function is $H=MIN\ ([\|t\|]\_1, [\|c\|]\_1, [\|r\|]\_1)$, and obtaining optimal execution paths that meet a condition and that can be obtained simultaneously, where the restriction condition is $\delta=\emptyset\times\vartheta\times\gamma$, $[\|t\|]\_1<\rho$, $[\|t\|]\_1<R$, and $1>\delta\_i>\varepsilon\_i$. $\varepsilon\_i=t\_i/(t\_i0)$ is defined, where $\varepsilon\_i$ is a minimum tolerance value, and is determined based on maximum waiting time $t\_(i0)$ of the single task. Generally, $t\_(i0)$ is greater than or equal to $t\_i$, $\rho$ is a CPU resource idle rate (in %), and R is a network resource idle rate (in %).

In the embodiments of this application, the scheduling apparatus may be divided into functional modules based on the foregoing examples of the service deployment method. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used.

Figure 7:
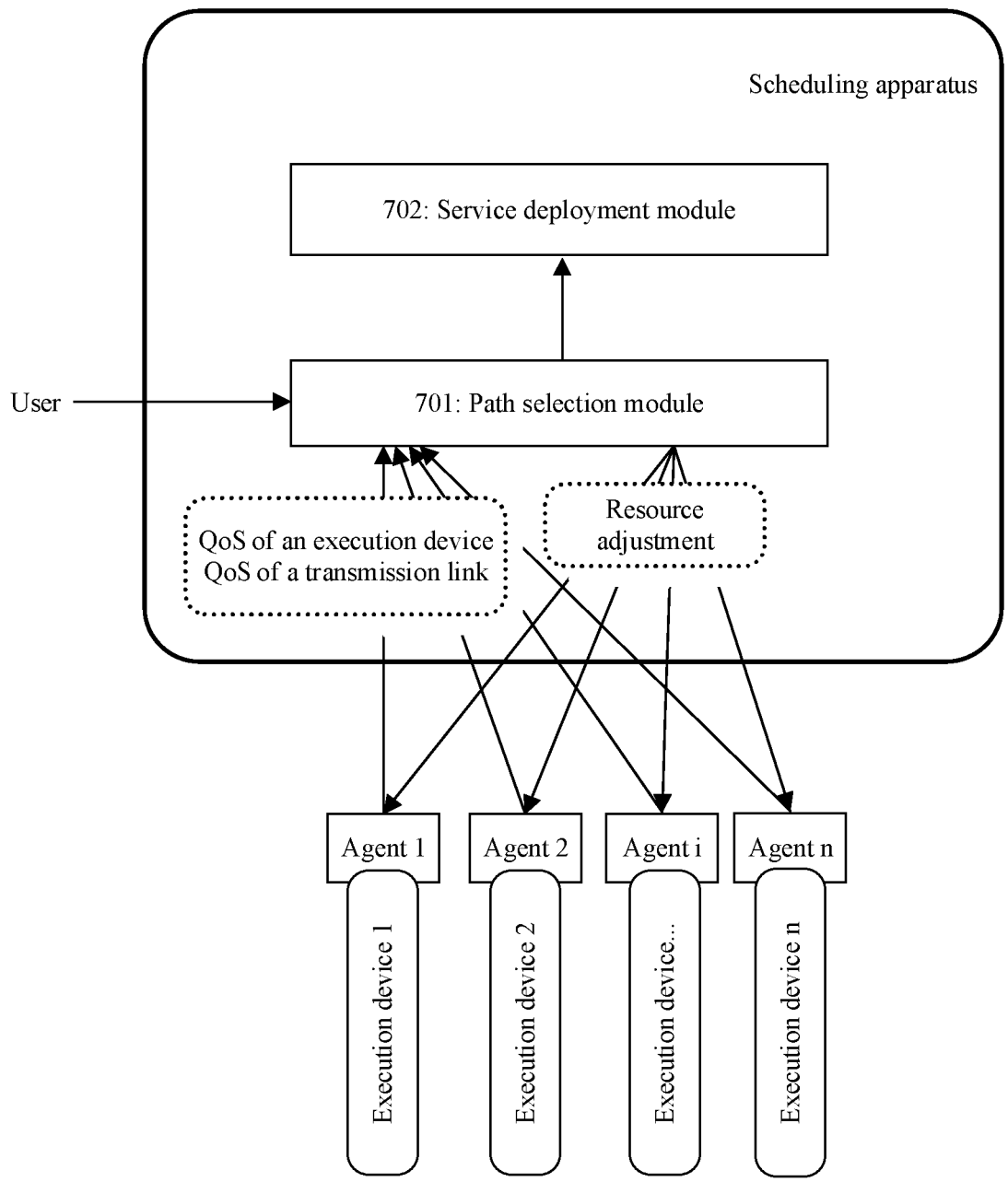
FIG. 7 is a schematic diagram of a scheduling apparatus according to an embodiment of this application.

For example, FIG. 7 is a schematic diagram of a scheduling apparatus. The scheduling apparatus provided in an embodiment of this application may include a path selection module 701, configured to determine an execution path of a to-be-deployed service, where the execution path includes at least two execution devices, and obtain quality of service QoS of each execution device, calculate QoS of the execution path based on the QoS of each execution device, obtain preset QoS of the to-be-deployed service, and finally determine that a relationship between the QoS of the execution path and the preset QoS meets a preset rule, and a service deployment module 702, configured to deploy the to-be-deployed service on the execution path after the path selection module determines that the relationship between the QoS of the execution path and the preset QoS meets the preset rule, where the at least two execution devices are configured to separately execute the to-be-deployed service.

In some implementations of this application, the path selection module 701 is further configured to, before calculating the QoS of the execution path based on the QoS of each execution device, obtain QoS of at least one transmission link between the at least two execution devices, and calculate the QoS of the execution path based on the QoS of each execution device and the QoS of the at least one transmission link.

In some implementations of this application, the path selection module 701 is further configured to determine at least two first QoS calculation formulas corresponding to each execution device, where one execution device corresponds to one QoS calculation formula, send each first QoS calculation formula to a corresponding execution device, and finally obtain the QoS of each execution device that is obtained by each execution device according to a corresponding first QoS calculation formula.

In some implementations of this application, the path selection module 701 is further configured to determine at least one second QoS calculation formula corresponding to the at least one transmission link, send each second QoS calculation formula to an execution device on a corresponding transmission link, and finally obtain QoS of each transmission link that is obtained by the execution device on the at least one transmission link according to a corresponding second QoS calculation formula.

In some implementations of this application, the path selection module 701 is further configured to determine a weight of the QoS of each execution device, and determine the QoS of the execution path based on the QoS of each execution device and the corresponding weight.

In this embodiment of this application, the path selection module 701 is further configured to determine N execution paths based on resources required by the to-be-deployed service, where specifications of resources included in execution devices on each execution path are not lower than specifications of the resources required by the to-be-deployed service, if a relationship between QoS of each of the N execution paths and the preset QoS does not meet the preset rule, perform resource adjustment, that is, adjust specifications of resources in execution devices on any execution path until an execution path that meets a preset QoS condition is obtained.

In this embodiment of this application, after the path selection module determines that the relationship between the QoS of the execution path and the preset QoS meets the preset rule, the path selection module 701 is further configured to predict QoS of the execution path in a next periodicity, to obtain predicted QoS of the execution path, where the QoS of the execution path is the QoS of the execution path in a current periodicity, and determine that a relationship between the predicted QoS of the execution path and the preset QoS also meets the preset rule.

The service deployment module 702 is further configured to, after the path selection module determines that the relationship between the predicted QoS of the execution path and the preset QoS meets the preset rule, deploy the to-be-deployed service on the execution path.

A specific function and a structure of the scheduling apparatus in the embodiment corresponding to FIG. 7 are used to implement the steps performed by the scheduling apparatus in FIG. 3 to FIG. 6A and FIG. 6B. Details are not described herein again.

Figure 8:
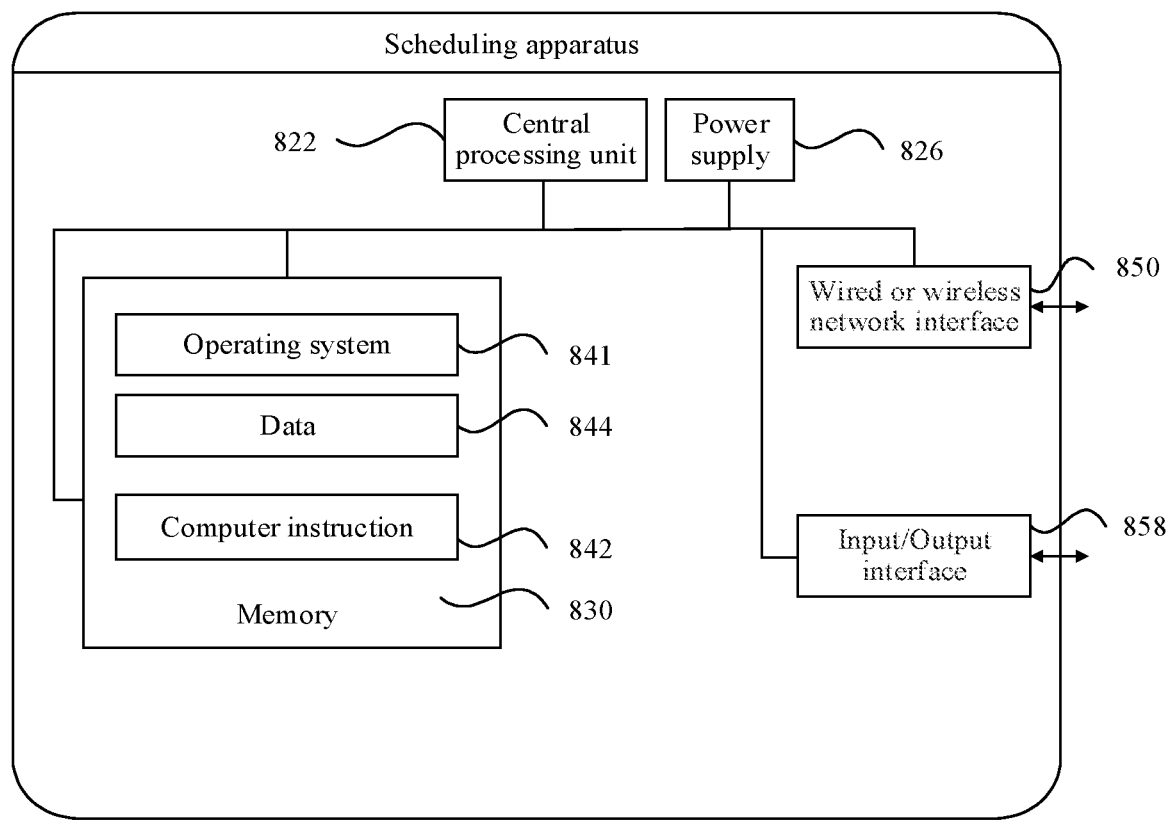
FIG. 8 is another schematic diagram of a scheduling apparatus according to an embodiment of this application.

FIG. 7 describes the scheduling apparatus in the embodiments of this application from a perspective of a modular functional entity. The following describes the scheduling apparatus in the embodiments of this application from a perspective of hardware processing. FIG. 8 is a schematic diagram of an embodiment of a scheduling apparatus according to an embodiment of this application. The scheduling apparatus includes the following features.

The scheduling apparatus may vary greatly with different configurations or performance, and may include one or more CPUs 822 (for example, one or more processors) and one or more memories 830, where one or more computer instructions 842 or data 844 is stored on the memory 830. The memory 830 may perform transient storage or persistent storage. The memory 830 may include one or more modules (not shown in the figure), and each module may include an operation on a series of computer instructions in the scheduling apparatus. Further, the central processing unit 822 may be configured to communicate with the memory 830, and execute, on the scheduling apparatus, the operations of the series of computer instructions in the memory 830.

The scheduling apparatus may further include one or more power supplies 826, one or more wired or wireless network interfaces 850, one or more input/output interfaces 858, and/or one or more operating systems 841.

Steps in the service deployment methods described in FIG. 3 to FIG. 6A and FIG. 6B are implemented by the scheduling apparatus based on the structure shown in FIG. 8.

All or some of the foregoing embodiments may be implemented by using software, hardware, firmware, or any combination thereof. When the software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive), or the like.

What is claimed is:

1. A method comprising:
   determining an execution path of a to-be-deployed service, wherein the execution path comprises a first execution device and a second execution device;
   obtaining a first quality of service (QoS) of the first execution device according to a first QoS calculation formula corresponding to the first execution device;
   obtaining a second QoS of the second execution device according to a second QoS calculation formula corresponding to the second execution device;
   obtaining a third QoS of at least one transmission link between the first execution device and the second execution device according to at least one QoS calculation formula corresponding to the at least one transmission link;
   calculating a fourth QoS of the execution path based on the first QoS, the second QoS, and the third QoS;
   obtaining a preset QoS of the to-be-deployed service;
   making a first determination that a first relationship between the fourth QoS and the preset QoS meets a preset rule; and
   deploying, in response to the first determination, the to-be-deployed service on the execution path to enable the first execution device and the second execution device to separately execute the to-be-deployed service.

2. The method of claim 1, further comprising:
   determining the first QoS calculation formula corresponding to the first execution device;
   determining the second QoS calculation formula corresponding to the second execution device;
   sending the first QoS calculation formula to the first execution device;
   sending the second QoS calculation formula to the second execution device;
   further obtaining the first QoS according to the first QoS calculation formula; and
   further obtaining the second QoS according to the second QoS calculation formula.

3. The method of claim 1, further comprising:
   determining the at least one QoS calculation formula corresponding to the at least one transmission link;
   sending each QoS calculation formula in the at least one QoS calculation formula to a third execution device on a corresponding transmission link; and
   obtaining a fifth QoS of each transmission link that is obtained by the third execution device according to a corresponding QoS calculation formula.

4. The method of claim 1, further comprising:
   determining a first weight of the first QoS;
   determining a second weight of the second QoS; and
   determining the fourth QoS based on the first weight and the second weight.

5. The method of claim 1, further comprising:
   determining N execution paths based on first resources for the to-be-deployed service, wherein first specifications of second resources comprised in execution devices on each of the N execution paths are not lower than second specifications of the first resources;
   making a second determination that a second relationship between a fifth QoS of each of the N execution paths and the preset QoS does not meet the preset rule; and
   adjusting, in response to the second determination, the first specifications of any of the N execution paths until a second execution path that meets a preset QoS condition is obtained.

6. The method of claim 1, wherein after making the first determination and before deploying the to-be-deployed service on the execution path, the method further comprises:
   predicting a fifth QoS of the execution path in a next periodicity to obtain a predicted QoS of the execution path, wherein the fourth QoS is of the execution path in a current periodicity; and
   determining that a second relationship between the predicted QoS and the preset QoS meets the preset rule.

7. A computing device comprising:
   a memory configured to store executable instructions; and
   a processor coupled to the memory and configured to execute the executable instructions to cause the computing device to:
      determine an execution path of a to-be-deployed service, wherein the execution path comprises a first execution device and a second execution device;
      obtain a first quality of service (QoS) of the first execution device according to a first QoS calculation formula corresponding to the first execution device;
      obtain a second QoS of the second execution device according to a second QoS calculation formula corresponding to the second execution device;
      obtain a third QoS of at least one transmission link between the first execution device and the second execution device according to at least one QoS calculation formula corresponding to the at least one transmission link;
      calculate a fourth QoS of the execution path based on the first QoS, the second QoS, and the third QoS;
      obtain a preset QoS of the to-be-deployed service;
      make a first determination that a first relationship between the fourth QoS and the preset QoS meets a preset rule; and
      deploy, in response to the first determination, the to-be-deployed service on the execution path to enable the first execution device and the second execution device to separately execute the to-be-deployed service.

8. The computing device of claim 7, wherein the processor is further configured to execute the executable instructions to cause the computing device to:
   determine the a first QoS calculation formula corresponding to the first execution device;
   determine the second QoS calculation formula corresponding to the second execution device;
   send the first QoS calculation formula to the first execution device;
   send the second QoS calculation formula to the second execution device;
   further obtain the first QoS according to the first QoS calculation formula; and
   further obtain the second QoS according to the second QoS calculation formula.

9. The computing device of claim 7, wherein the processor is further configured to execute the executable instructions to cause the computing device to:
- determine at least one QoS calculation formula corresponding to the at least one transmission link;
- send each QoS calculation formula in the at least one QoS calculation formula to a third execution device on a corresponding transmission link; and
- obtain a fifth QoS of each transmission link that is obtained by the third execution device according to a corresponding QoS calculation formula.

10. The computing device of claim 7, wherein the processor is further configured to execute the executable instructions to cause the computing device to:
- determine a first weight of the first QoS;
- determine a second weight of the second QoS; and
- determine the fifth QoS based on the first weight and the second weight.

11. The computing device of claim 7, wherein the processor is further configured to execute the executable instructions to cause the computing device to:
- determine N execution paths based on first resources for the to-be-deployed service, wherein first specifications of second resources comprised in execution devices on each of the N execution paths are not lower than second specifications of the first resources;
- make a second determination that a second relationship between a fifth QoS of each of the N execution paths and the preset QoS does not meet the preset rule; and
- adjust, in response to the second determination, the first specifications of any of the N execution paths until a second execution path that meets a preset QoS condition is obtained.

12. The computing device of claim 7, wherein the processor is further configured to execute the executable instructions to cause the computing device to:
- predict a fifth QoS of the execution path in a next periodicity to obtain a predicted QoS of the execution path, wherein the fourth QoS is of the execution path in a current periodicity; and
- determine that a second relationship between the predicted QoS and the preset QoS meets the preset rule.

13. A computer program product comprising computer-executable instructions that are stored on a non-transitory computer-readable storage medium and that, when executed by a processor, cause an apparatus to:
- determine an execution path of a to-be-deployed service, wherein the execution path comprises a first execution device and a second execution device;
- obtain a first quality of service (QoS) of the first execution device according to a first QoS calculation formula corresponding to the first execution device;
- obtain a second QoS of the second execution device according to a second QoS calculation formula corresponding to the second execution device;
- obtain a third QoS of at least one transmission link between the first execution device and the second execution device according to at least one QoS calculation formula corresponding to the at least one transmission link;
- calculate a fourth QoS of the execution path based on the first QoS, the second QoS, and the third QoS;
- obtain a preset QoS of the to-be-deployed service;
- make a first determination that a first relationship between the fourth QoS and the preset QoS meets a preset rule; and
- deploy, in response to the first determination, the to-be-deployed service on the execution path to enable the first execution device and the second execution device to separately execute the to-be-deployed service.

14. The computer program product of claim 13, wherein the computer-executable instructions further cause the apparatus to:
- determine the first QoS calculation formula corresponding to the first execution device;
- determine the second QoS calculation formula corresponding to the second execution device;
- send the first QoS calculation formula to the first execution device;
- send the second QoS calculation formula to the second execution device;
- further obtain the first QoS according to the first QoS calculation formula; and
- further obtain the second QoS according to the second QoS calculation formula.

15. The computer program product of claim 13, wherein the computer-executable instructions further cause the apparatus to:
- determine at least one QoS calculation formula corresponding to the at least one transmission link;
- send each QoS calculation formula in the at least one QoS calculation formula to a third execution device on a corresponding transmission link; and
- obtain a fifth QoS of each transmission link that is obtained by the third execution device according to a corresponding QoS calculation formula.

16. The computer program product of claim 13, wherein the computer-executable instructions further cause the apparatus to:
- determine a first weight of the first QoS;
- determine a second weight of the second QoS; and
- determine the fourth QoS based on the first weight and the second weight.

17. The computer program product of claim 13, wherein the computer-executable instructions further cause the apparatus to:
- determine N execution paths based on first resources for the to-be-deployed service, wherein first specifications of second resources comprised in execution devices on each of the N execution paths are not lower than second specifications of the first resources;
- make a second determination that a second relationship between a fifth QoS of each of the N execution paths and the preset QoS does not meet the preset rule; and
- adjust, in response to the second determination, the first specifications of any of the N execution paths until a second execution path that meets a preset QoS condition is obtained.

18. The computer program product of claim 13, wherein the computer-executable instructions further cause the apparatus to predict a fifth QoS of the execution path in a next periodicity to obtain a predicted QoS of the execution path, and wherein the fourth QoS is of the execution path in a current periodicity.

19. The computer program product of claim 18, wherein the computer-executable instructions further cause the apparatus to determine that a second relationship between the predicted QoS and the preset QoS meets the preset rule.

20. The computer program product of claim 13, wherein the computer-executable instructions further cause the apparatus to obtain the first QoS and the second QoS based on a mapping relationship between specifications of resources included in each execution device on the execution path.

\* \* \* \* \*